US012311364B2

(12) United States Patent
Prakash et al.

(10) Patent No.: US 12,311,364 B2
(45) Date of Patent: May 27, 2025

(54) FLUIDIC DEVICE, APPARATUS COMPRISING FLUIDIC DEVICE AND METHOD OF USING SAME FOR FLUIDIC MANIPULATION

(71) Applicant: Brinter Oy, Turku (FI)

(72) Inventors: Dhayakumar Rajan Prakash, Turku (FI); Tomi Kalpio, Turku (FI)

(73) Assignee: Brinter Oy, Turku (FI)

( * ) Notice: Subject to any disclaimer, the term of this patent is extended or adjusted under 35 U.S.C. 154(b) by 0 days.

(21) Appl. No.: 17/583,915

(22) Filed: Jan. 25, 2022

(65) Prior Publication Data

US 2023/0234049 A1 Jul. 27, 2023

(51) Int. Cl.
*B01L 3/00* (2006.01)

(52) U.S. Cl.
CPC ..... *B01L 3/502715* (2013.01); *B01L 3/50273* (2013.01); *B01L 2300/0609* (2013.01); *B01L 2300/0663* (2013.01); *B01L 2300/0816* (2013.01); *B01L 2300/0883* (2013.01); *B01L 2400/0666* (2013.01)

(58) Field of Classification Search
CPC .. C12Q 1/6827; C12Q 1/6869; C12Q 1/6876; C12Q 1/6883; C12Q 1/6886; C12Q 2600/156; G16B 20/00; G16B 20/10; G16B 20/20; G16B 25/00; G16B 25/10; G16B 30/00; G16B 30/10; G16B 40/00
See application file for complete search history.

(56) References Cited

U.S. PATENT DOCUMENTS

2004/0137604 A1* 7/2004 Goodman ............... B01L 9/527 435/288.3
2009/0302190 A1* 12/2009 Trieu ...................... B01L 9/527 248/682
2010/0166612 A1 7/2010 Lehto
2019/0224676 A1 7/2019 Cox-Muranami et al.
2019/0374946 A1 12/2019 Murer et al.
2020/0277558 A1* 9/2020 Ingber et al. .......... C12M 29/10

FOREIGN PATENT DOCUMENTS

WO 2017/214323 A1 12/2017

* cited by examiner

*Primary Examiner* — Jennifer Wecker
*Assistant Examiner* — Jonathan Bortoli
(74) *Attorney, Agent, or Firm* — Baker Hostetler

(57) ABSTRACT

A fluidic device having first side and second side. The fluidic device includes first latch mechanism and second latch mechanism for receiving connector, arranged on first side; and a first fluidic chip holder and second fluidic chip holder, arranged on first side in alignment with first latch mechanism and second latch mechanism, for holding first fluidic chip and second fluidic chip, respectively. The fluidic device includes a traction surface to couple the fluidic device with an actuator to move the fluidic device to select which of first or second fluidic chip is to be used. Disclosed is an apparatus with a container, tubular material feeding line, tubular printing composition feeding line, and actuator.

11 Claims, 15 Drawing Sheets

FLUIDIC DEVICE, APPARATUS COMPRISING FLUIDIC DEVICE AND METHOD OF USING SAME FOR FLUIDIC MANIPULATION

TECHNICAL FIELD

The present disclosure relates generally to microfluidics; and more specifically, to fluidic devices and apparatuses comprising fluidic devices. The present disclosure also relates to methods for selecting a first or a second fluidic chip for fluidic manipulation using the aforementioned apparatuses.

BACKGROUND

In recent times, fluidics is emerging as an innovative technology due to various applications including micro-applications thereof. In this regard, the said applications involve micro-to-liter level volumes of fluids moving through a system. Normally, the fluidic-based systems (or fluidic systems) find applications in diverse fields such as pharma, optics, life sciences, chemicals, and so forth. However, the fluidic system still faces challenges in its commercialization as it fails to meet the needs of industries that demand analytical efficiency and high-throughput capabilities, without a loss of precision and automation thereof.

Conventionally, the fluidic system such as those used in microfluidic printing (mostly bio extrusion printing and pharma extrusion printing) employ a single fluidic chip or multiple fluidic chips along with a single or multiple nozzles for printing to enable printing thereof. However, said microfluidic printing systems lack mechanism available for printing with multiple fluidic chips (and multiple nozzles of the printing head of a three-dimensional (3D) printer) without switching the fluidic chips (or replacing the nozzles) for simultaneous deposition of multiple fluidic chips and biomaterials from the multiple nozzles to produce complex and heterogeneous structures. Moreover, the said fluidic systems may be used in pharma extrusion printing for small-scale production of pharmaceuticals. However, the manufacturing of the pharmaceutical compositions on a large-scale for clinical development and commercial production has traditionally been challenging. Additionally, the said fluidic systems require costly and time-consuming cleaning and sterilization thereof. Furthermore, the said fluidic system are subject to cross contamination while manually switching the fluidic chips (or replacing the nozzles), thereby risking the contamination of pharmaceutical products therein. Moreover, the said fluidic system have reduced production speed and quality of the printed object. Furthermore, the said fluidic system encounters several problems, such as inefficient fluidic channels, blockage of fluidic chips during producing stable emulsions, and so forth. Thus, transforming said multidimensional printing process from a highly productive to an unsustainable process.

Therefore, in light of the foregoing discussion, there exists a need to eliminate or mitigate one or more of the above drawbacks of the existing fluidic systems.

SUMMARY

The present disclosure seeks to provide a fluidic device. The present disclosure also seeks to provide an apparatus comprising fluidic devices. The present disclosure also seeks to provide a method for selecting a first or a second fluidic chip for fluidic manipulations using the aforementioned apparatus. The present disclosure seeks to provide a solution to the existing problems related to the fluidic manipulations such as slow production process due to manual intervention for changing the fluidic chips. An aim of the present disclosure is to provide a solution that overcomes at least partially the problems encountered in prior art, and provides an efficient, user-friendly, hygienic, and cost-efficient fluidic system.

In one aspect, an embodiment of the present disclosure provides a fluidic device having a first side and a second side opposite to the first side, the fluidic device comprising:

- a first latch mechanism for receiving a connector, the first latch mechanism arranged on the first side;
- a first fluidic chip holder for holding a first fluidic chip, the first fluidic chip holder arranged on the first side in an alignment with the first latch mechanism;
- a second latch mechanism for receiving the connector, the second latch mechanism arranged on the first side;
- a second fluidic chip holder for holding a second fluidic chip, the second fluidic chip holder arranged on the first side in an alignment with the second latch mechanism, wherein the first latch mechanism and the second latch mechanism are arranged spatially in different positions on the first side; and
- a traction surface to couple the fluidic device with an actuator to move the fluidic device to select which of the first or the second fluidic chip is to be used.

In another aspect, an embodiment of the present disclosure provides an apparatus comprising

- a container for at least one source material;
- a tubular material feeding line connected to the container from a first end and having a connector on the second end, wherein the connector is selectable removably connectable to one latch mechanism at the time of at least two latch mechanisms of a fluidic device;
- a tubular printing composition feeding line connected to the connector from a third end and to a target tool from a fourth end, wherein a printing composition for the target tool is formed in a fluidic chip assembled in a fluidic chip holder of the fluidic device and the connector is fluidly connected to the fluidic chip when in use; and

- an actuator configured to move the fluidic device to select which of the at least two latch mechanisms receive the connector at the time.

In yet another aspect, an embodiment of the present disclosure provides a method for selecting a first or a second fluidic chip for fluidic manipulations, the method comprising

- arranging a first and a second fluidic chip on a first side of a fluidic device at spatially different positions;
- moving the fluidic device to a first relative position in respect to a connector to select the first fluidic chip; and
- moving the fluidic device to a second relative position in respect to the connector to select the second fluidic chip, wherein the connector provides source material for the selected fluidic chip and receives the printing composition from the selected fluidic chip.

Embodiments of the present disclosure substantially eliminate or at least partially address the aforementioned problems in the prior art, and provide an efficient fluidic device capable of switching fluidic chips for fluidic manipulations without manual intervention. Beneficially, said fluidic device may find in applications such as printing, formulating, synthesizing, dosing, and filling of a fluid into a plurality of fluidic chips automatically and without requiring manually switching thereof. Additionally, automatic switching of the fluidic chips prevents cross-contamination of the fluidic chips while performing fluidic manipulations. Moreover, the automatic feature of the said apparatus saves time required in the production line.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
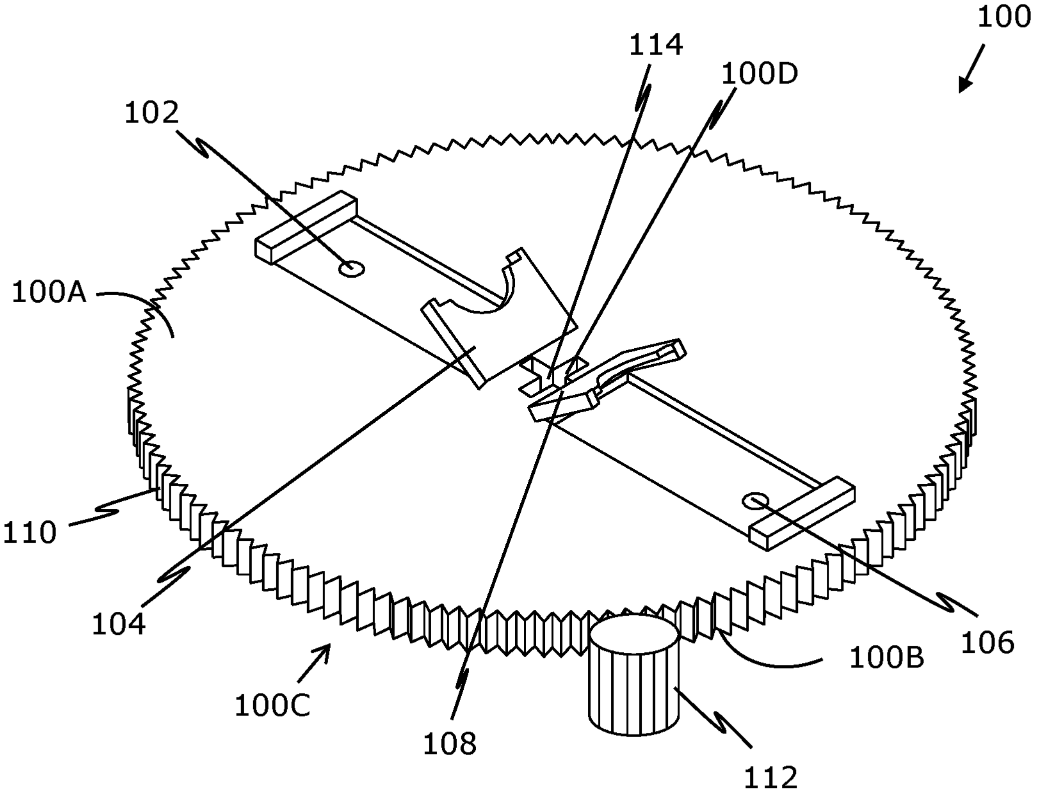
FIGS. 1A and 1B are a perspective view and a side view, respectively, of a fluidic device, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a fluidic device having a first side and a second side opposite to the first side, the fluidic device comprising:

- a first latch mechanism for receiving a connector, the first latch mechanism arranged on the first side;
- a first fluidic chip holder for holding a first fluidic chip, the first fluidic chip holder arranged on the first side in an alignment with the first latch mechanism;
- a second latch mechanism for receiving the connector, the second latch mechanism arranged on the first side;
- a second fluidic chip holder for holding a second fluidic chip, the second fluidic chip holder arranged on the first side in an alignment with the second latch mechanism, wherein the first latch mechanism and the second latch mechanism are arranged spatially in different positions on the first side; and

- a traction surface to couple the fluidic device with an actuator to move the fluidic device to select which of the first or the second fluidic chip is to be used.

In another aspect, an embodiment of the present disclosure provides an apparatus comprising

- a container for at least one source material;
- a tubular material feeding line connected to the container from a first end and having a connector on the second end, wherein the connector is selectable removably connectable to one latch mechanism at the time of at least two latch mechanisms of a fluidic device;
- a tubular printing composition feeding line connected to the connector from a third end and to a target tool from a fourth end, wherein a printing composition for the target tool is formed in a fluidic chip assembled in a fluidic chip holder of the fluidic device and the connector is fluidly connected to the fluidic chip when in use; and
- an actuator configured to move the fluidic device to select which of the at least two latch mechanisms receive the connector at the time.

In yet another aspect, an embodiment of the present disclosure provides a method for selecting a first or a second fluidic chip for fluidic manipulations, the method comprising

- arranging a first and a second fluidic chip on a first side of a fluidic device at spatially different positions;
- moving the fluidic device to a first relative position in respect to a connector to select the first fluidic chip; and moving the fluidic device to a second relative position in respect to the connector to select the second fluidic chip, wherein the connector provides source material for the selected fluidic chip and receives the printing composition from the selected fluidic chip.

The present disclosure provides the aforementioned fluidic device, the aforementioned apparatus comprising the fluidic device and the aforementioned method for selecting a first or a second fluidic chip for fluidic manipulations using the said apparatus. Beneficially, the fluidic device is configured to hold multiple fluidic chips, thereby enabling a user thereof to use the fluidic device based on the fluidic manipulation. Additionally, said fluidic device provides users to use multiple fluidic chips at once with no manual intervention for switching the multiple fluidic chips for the desired fluidic manipulation. Moreover, the coupling of the traction surface with the actuator increases the production efficiency of the fluidic device. Beneficially, the fluidic device may be employed in applications such as printing, formulating, synthesizing, dosing and filling of the fluid into the one or more fluidic chips automatically without requiring manual intervention for switching the fluidic chips (or replacing the printing nozzles of a printing head of a 3D printer). Advantageously, said automatic operation prevents cross-contamination of the fluids or the final product during the use of the fluidic device.

Throughout the present disclosure, the term "fluidic device" as used herein refers to a device that is capable of carrying or holding fluids for performing a process, referred to as a fluidic function. Optionally, the fluid device may perform a fluidic function by handling multiple or single fluid through a set of manipulations that may be active (with external energy for example, electric field, heat, radiation, electric, acoustic, magnetic, centrifugal, temperature and the like) or passive (for example, without external force, i.e. just based on the dimensions or structure) to get the desired outcome. It will be appreciated that various applications rely on passive manipulations using capillary forces, in the form of capillary flow modifying elements, akin to flow resistors and flow accelerators, and in some applications, external actuation means are additionally used for a directed transport of the fluid. The fluidic function may be a mixing, heating, filtering, or reacting of at least two fluids. Herein a fluid is a substance such as liquid, gas, particle and material that has an ability to deform under an applied external force. Notably, the fluid may be of any shape (or geometry) and dimension (such as micro, nano, pico, femto, centi, deci, deca, atto, hecto, kilo, mega, giga).

Often, processes normally carried out in a lab are miniaturized on a single chip (namely, fluidic chip) or multiple fluidic chips, which enhance efficiency and mobility, and reduces sample and reagent volumes. Optionally, the fluidic device may be designed as a clear plate or a chip for improved optical clarity or as coated plate or chip for use in fluorescence and/or luminescence studies. Optionally, the fluidic device may be a microfluidic device that could process small quantities of fluids by using tiny channels having dimensions at the microscale (typically tens to hundreds of micrometers) leading to the fluidic chips. The terms "first side" and "second side" as used herein refer to two opposite faces of the fluidic device implemented as a flat disc. Optionally, the fluidic device may have various geometrics such a circle (CD), a triangle, a square, a rectangle, a pentagon, a hexagon, and so forth. Beneficially, a circular, a linear, or a roll-to-roll geometry of the fluidic device allows a user to use the fluidic device based on the need of application. Optionally, the fluidic device may be a CD-shaped disc holding up to 1 M chips or a roll with unlimited number of chips. Optionally, the fluidic device may be a liner device or a roll-to-roll device that can hold multiple chips linearly.

The terms "first fluidic chip" and "second fluidic chip" as used herein refer to chips that can handle extremely small to larger volumes of fluid to be processed or visualized therein. Optionally, the chip may be transparent and may have varied length and width based on the application thereof. Optionally, the first fluidic chip and the second fluidic chip may be fabricated using thermoplastics such as acrylic, glass, silicon, or a transparent silicone rubber called PDMS, and so forth, in various shapes and sizes, using for example photolithography, for use in various applications. In this regard, the fluidic chips are typically provided with one or more inlet and outlet channels for performing the desired fluidic manipulations therein based on the application thereof. Optionally, the user may use the fluidic chip with material he wants to deposit or extrude or withdraw based on the need of application with various stimulus (such as temperature control, ultrasonication, modulated wavelength) based on the need of application. It will be appreciated that in an embodiment, the first fluidic chip and the second fluidic chip may be external fluidic chips manufactured outside the disclosed system but used therewith for various applications ranging from printing, formulating, synthesising, dosing, filling, and so forth. In another embodiment, the first fluidic chip and the second fluidic chip may be integrated in the fluidic device in respective predefined slots, namely the first fluidic chip holder and the second chip holder. Notably, the external fluidic chips manufactured may be of rectangular, triangular, square, round, or any polygonal shape and can be made in any size so that it can efficiently be used in different applications. Optionally, the fluidic chip size may be a standard 25×35 mm.

The terms "first fluidic chip holder" and "second fluidic chip holder" as used herein refer to means for holding the first fluidic chip and the second fluidic chip, respectively. In this regard, the first fluidic chip holder and the second chip holder are arranged on the first side of the fluidic device. Furthermore, the first chip holder and the second chip holder are arranged spatially in different positions on the first side of the fluidic device for holding the first fluidic chip and the second fluidic chip, respectively. In this regard, the first fluidic chip holder and the second chip holder may be implemented as a slot for holding the first fluidic chip and the second fluidic chip, respectively. Optionally, the first fluidic chip holder and the second chip holder may further comprise a tab for securing the first fluidic chip and the second fluidic chip therein, respectively. Optionally, the fluidic device may have multiple fluidic chip holders, such as the first fluidic chip holder and the second fluidic chip holder, that can hold multiple fluidic chips, such as the first fluidic chip and the second fluidic chip. Optionally, the multiple fluidic chip holders for holding the multiple fluidic chips may be arranged radially or in any other pattern on the first side and the second side of the fluidic device.

The terms "first latch mechanism" and "second latch mechanism" as used herein refer to mechanisms used for fastening two or more objects or surfaces while allowing for regular separation thereof. In this regard, the fluidic device comprises the first latch mechanism and the second latch mechanism for receiving a connector. Moreover, the first latch mechanism and the second latch mechanism are arranged adjacent to each other on the first side of the fluidic device. Furthermore, the first latch mechanism and the second latch mechanism are arranged for a proper connection between a first fluidic chip and a second fluidic chip to the connector on the first side when the connector in use. Optionally, the first latch mechanism and the second latch mechanism may be a hole in the fluidic device having a maximum length of less than 50% of the thickness of the fluidic device. Optionally, the first latch mechanism and the second latch mechanism may be a center latch, an outer latch or a notch. Optionally, the hole may be of any geometry such as a half-circle, a square, a triangle, and so forth. In the middle of the first latch mechanism and the second latch mechanism there is a tightening mechanism on the fluidic device end that is less than 90% of the thickness of the fluidic device. Optionally, the tightening mechanism may be of any geometry such as a screw, a finger, a hook, and so forth. Typically, the tightening mechanism is used with the first latch mechanism and the second latch mechanism to secure the first fluidic chip and the second fluidic chip to the connector on the first side of the fluidic device, respectively. In this regard, it will be appreciated that the tightening mechanism and the first and second latch mechanisms are structurally complementary. Optionally, the first latch mechanism and the second latch mechanism may have geometries in radial and asymmetrical distribution for linear fluidic adapters acting as reference for easy identification of multiple tubes associated with the connector. Optionally, multiple latch mechanism may be used in high pressure application.

The term “connector” as used herein refers to a means of attachment or a plurality of receiving cavities for enabling transfer of fluid from one location (such as a reservoir thereof) to another location (such as the first and second fluidic chips). Optionally, there may be a single connector or multiple connectors. In this regard, the connector comprises multiple tubes, each tube having an inlet and an outlet for passing the fluid therethrough, thereby making the connector an integral feature of the fluidic device. Moreover, the inlet and an outlet of tubes are led to corresponding inlet and outlet channels of the first and second fluidic chips for passing the fluid from a fluid reservoir to the first and second fluidic chips via the connector. Beneficially, multiple inlet tubes provide users to use multiple fluidic materials (or printing materials) at once. In an example, based on the application, such as for sorting applications, the user may need one inlet tube and 5 outlet tubes. In another example, the user may need 5 inlets and one outlet such as for emulsion systems. It will be appreciated that after installation (namely alignment) of the connector with the first or second fluidic chips, the connector is ready for use for the desired application.

Moreover, the first latch mechanism and the second latch mechanism are used to locate the connector into the right position and hold multiple tubes in the single connector. Moreover, the connectors are located wisely in a right position and angle to enable parallel operation of the connectors and the first fluidic chip and the second fluidic chip, thereby increasing production efficiency with parallel operations.

Furthermore, the connector is selected to cover the maximum number of configurations (i.e., to fit to all chips inlets/outlets) without requiring a need of changing the connector during an extruding process.

Optionally, each tube of the connector may have a uniform cross sectional area or may have a different cross sectional area based on the fluidic manipulation. Optionally, the cross sectional area of the tubes associated with the connector may range from millimeters to centimeters. Optionally, the connector may have various shapes such as circle, rectangle, triangle, square, and so forth, thereby not limiting the user to perform various fluidic manipulations. Beneficially, the connector with tubes having different cross sectional area and/or shapes can be used for performing various fluidic manipulations at once unlike conventional systems which require manual replacement of different connectors with tubes having different cross sectional areas and shapes. Additionally, beneficially, said feature allows the connectors to incorporate tubes having multiple cross sectional areas and pressure and chemical compatibility to perform various fluidic manipulations at once. In this regard, the inlet of the multiple tubes associated with the connector may comprise chemical resistant bushes to make the junctions between the connector and the inlet of the multiple tubes leak free and compatible for a wide range of pressures for operation thereof. Additionally, the connectors are quick and easy to connect and/or disconnect and have a compact design.

The term “traction surface” as used herein refers to a moving mechanism that provides a mechanical connection to an external rotating mechanism. In this regard, the traction surface is implemented to couple the fluidic device with an actuator to move the fluidic device to select which of the first or the second fluidic chip is to be used. Optionally, the movement is one of: a linear movement or a rotational movement. Notably, the rotational movement may be a movement perpendicular to a central axis of the fluidic device, and the linear motion may be a movement along the central axis of the fluidic device.

Optionally, the traction surface is arranged on any one of: the first side, the second side, an outer periphery, or in a middle of the fluidic device. It will be appreciated that the said arrangement of the traction surface enables the movement of the fluidic device along an XY-plane. It will be appreciated that besides the arrangement of the traction surface, the movement type is also dependent on the structure of the fluidic device. For example, a linear fluidic device may be associated with a linear movement thereof, and a cylindrical or a roll-to-roll fluidic device may be associated with a rotational movement thereof. Optionally, the traction surface is a gear-tooth mechanism or a pulley-mechanism. In an example, the traction surface may be implemented as a plurality of teeth associated with the gear-tooth mechanism arranged on the outer periphery of the fluidic device. In another example, the traction surface may be implemented as a pulley-mechanism arranged on the first side, second side or in the middle of the fluidic device. Alternatively, optionally, the traction surface may be implemented as a patterned surface having any of: a linear guide, a rotary guide, a belt or similar such rotation or linear displacement mechanisms. Beneficially, the traction surface ensures right positioning of the fluidic device when in use.

The term “actuator” as used herein refers to a component that is used for moving and controlling a moving mechanism. In this regard, the actuator works in conjunction with the traction surface to change the direction (namely, by displacing) of the fluidic device. Optionally, the actuator may be a motor. In this regard, the motor working in conjunction with the traction surface is configured to provide a linear movement or a rotational movement to the fluidic device. Moreover, the motor working in conjunction with the traction surface is also arranged on any one of: the first side, the second side, an outer periphery, or in a middle of the fluidic device.

Optionally, the fluidic device further comprises at least one holder for an encoder, wherein the encoder is operatively coupled to the actuator to detect the position of the fluidic device during movement of the fluidic device to select which one of the first fluidic chip and the second fluidic chip is to be used. The term "encoder" as used herein refers to a sensor device for detecting a position, a count, a speed or a direction of an object in motion. In this regard, the encoder converts motion signals into electrical signals that are read by a controller unit to determine a position, a count, a speed or a direction of an object in motion. Herein, the encoder employs a position indicator to indicate an exact position of the fluidic chip on the fluidic device. Optionally, the position indicator may be any of any shape, such as a '+', 'H', 'I', 'O', 'X', '.', and so forth. The encoder may be a magnetic encoder, an electronic encoder, an electro-mechanical position measuring apparatus, and so on. Moreover, the holder for the encoder may be of any geometrical size that allows for the rotation or displacement of the fluidic device, while still enabling the encoder to record the exact position of the compartment. In this regard, the encoder may be modified to be able to receive sideflows from the fluidic chips.

Optionally, the motor may also include an encoder, thereby eliminating a need for a separate encoder to ensure exact position of the fluidic device.

Optionally, the first fluidic chip holder and the first latch mechanism is arranged to align and couple at least one input and at least one output of the first fluidic chip with the connector when the fluidic device is in a first position when in use, and the second fluidic chip holder and the second latch mechanism is arranged to align and couple at least one input and at least one output of the second fluidic chip with the connector when the fluidic device is in a second position when in use. Herein the terms "first position" and "second position" refer to different arrangement of the first fluidic chip holder and the second fluidic chip holder for desired fluidic manipulation. In this regard, the first position brings the first fluidic chip to align with the connectors to receive fluid and remove the excess fluid in required when in use for a desired application. Similarly, the second position brings the second fluidic chip to align with the connectors to receive fluid and remove the excess fluid in required when in use for a desired application. Beneficially, such multi-chip configuration of the fluidic device enables more efficient controlling and manipulation of fluids and makes possible to avoid manual assembling of fluidic chips.

In this regard, when the first fluidic chip is in use (i.e., in the first position), the connector is pushed down and centered to the first latch mechanism to align with the first fluidic chip for the desired application. The connector aligns with the first fluidic chip to connect tightly the multiple tubes associated with the connector with the corresponding inlet and outlet channels associated with the first fluidic chip. At the end of the operation with the first fluidic chip, the connector is released by opening a tightening mechanism (such as a screw, hook or finger) coupled to the first latch mechanism by using a separate tool. The connector is subsequently moved up over the fluidic device to allow the fluidic device to be rotated, such as by 30°, 60°, 90°, 120°, 150°, 180°, 210°, 240°, 270°, 300°, 330° to present subsequent fluidic chips, such as the second fluidic chip, aligned with the second latch mechanism, to align with the connector. Herein, when the second fluidic chip is in use (i.e. in the second position), the connector is pushed down and centered to the second latch mechanism to align with the second fluidic chip to connect tightly the multiple tubes associated with the connector with the corresponding inlet and outlet channels associated with the second fluidic chip.

Optionally, at least one additional latch mechanism and fluidic chip holder is arranged on the second side. Herein, the second side of the fluidic device may comprise additional one or more fluidic chip holders, such as a third fluidic chip holder and a fourth fluidic chip holder, for holding additional one or more fluidic chips, such as a third fluidic chip and a fourth fluidic chip. It will be appreciated that similar to the first and/or second fluidic chips on the first side of the fluidic device, the third and/or fourth fluidic chips on the second side of the fluidic device also comprise one or more inlet and outlet channels for performing the desired fluidic manipulations therein based on the application thereof. Optionally, the first and/or second fluidic chips and the third and/or fourth fluidic chips may be separated by the traction surface. Alternatively, the first and/or second fluidic chips and the third and/or fourth fluidic chips may be arranged with their backs facing each other and having a common traction surface to move the two units together. Beneficially, such double-sided configuration of the fluidic device enables controlling and manipulating fluids to get double the output of the fluidic device. Moreover, the outlet fluid from the first and/or second fluidic chips on the first side of the fluidic device may be provided as inlet fluid to the third and/or fourth fluidic chips on the second side of the fluidic device. Thus, also reducing the time to get the bulk outputs from the fluidic device. Alternatively, the double-sided configuration may employ multiple connectors, each supplying fluid to one fluidic chip. Additionally, beneficially, the double-sided configuration of the fluidic device provides a compact design that is smaller than the size and complexity associated with two separate units of fluidic devices.

In an exemplary implementation of the double-sided configuration, if there are 4-5 inlets of fluids on the first side of the fluidic device mixed then the said mixture is provided to the second side as output from the first side. Moreover, the second side may have one or two inlet liquids which are made to form droplets that also forms the output of the second side. In this example 2 connectors are used on both sides. Herein, the material may be different on different sides, for example glass on the first side and PDMS on the second side. This makes the usage much wider as having much more choices, such as solvent compatibility, pressure and flow handling.

Optionally, the fluidic device comprises a first fluid channel and a second fluid channel embedded inside of the fluidic device, wherein

- the first fluid channel has a first opening on the first side and a second opening on the second side and the first fluid channel is between the first opening and the second opening, and
- the second fluid channel has a third opening on the first side and a fourth opening on the second side and the second fluid channel is between the third opening and the fourth opening.

In this regard, the terms "first fluid channel" and "second fluid channel" as used herein refer to a capillary arrangement for supplying a fluid (such as analytes or printing material) to the fluidic device. Optionally, the first and the second fluid channels are integrated into the fluidic device, i.e. in between the PDMS layers thereof. Typically, the fluidic chips are usually fabricated by making thin grooves or small wells on the surface of a layer, and then enclosing those features by means of a second layer to form fluid channels, such as the first and the second fluid channels. Optionally, the first and the fluid channels may be made via soft lithography, hot embossing, injection molding, micro-machining, or etching. Notably, the inlet and outlet fluids pass through the first and the second fluid channels.

The first and the second fluid channels supply the fluids to the first and the second sides of the fluidic device, when in operation. In this regard, the first side of the fluidic device receives fluid via the first opening and the third opening of the first and the second fluid channels, respectively; and the second side of the fluidic device receives fluid via the second opening and the fourth opening of the first and the second fluid channels, respectively. Herein "first opening", "second opening", "third opening" and "fourth opening" refer to respective openings of the first channel and second channel on the first and second sides of the fluidic device.

Moreover, the first and the second fluid channels are configured to supply different concentrations and/or different flow rates of the fluids to each of the first and the second sides. Notably, the different flow rate of the fluids flowing through said first and the second fluid channels correspond to a fabrication material of the first and the second fluid channels, a thickness of the fabrication material of the first and the second fluid channels, viscosities and concentrations of the fluids, and so forth. Optionally, the first and the second fluid channels may be manufactured using the same fabrication material as that of the layers of the fluidic device or using a different material, for example Teflon, glass, fibre optic, and so forth. More optionally, the multiple layers of the fabrication material of the fluidic device, with the first and the second fluid channels integrated therein, are tightly sealed (or adhered to each other) to prevent the fluid from flowing out of the first and the second fluid channels. The overall tech effect here is that with increased surface area there are more tubular serpentine structures allowing the material to process, react and interact more efficiently by using both the first and the second sides of the given chip entity allowing user to have a fluidic manipulation in one chip.

Optionally, a cross sectional area of the first opening on the first side is larger than a cross sectional area of the second opening on the second side. The first opening on the first side provides the more fluid to the first side due to a larger cross sectional area thereof, and the second opening on the second side provides comparatively less fluid to the second side due to a smaller cross sectional area thereof. However, since the first opening and the second opening are two ends of the first fluid channel, therefore, the fluid is also allowed to directly flow between the first opening and the second opening, i.e., between the fluidic chips. Moreover, the flow of fluid from a larger cross sectional area associated with the first opening to a smaller cross sectional area associated with the second opening increases the pressure of the fluid which can be used in flow focusing for example. It will be appreciated that the fluidic device can be turned from upside down, i.e., the second side (lower side) comes atop the first side (upper side). In such case the second side having a smaller cross sectional area of the second opening leads to the first side having a larger cross sectional area of the first opening compared to the abovementioned original situation. Herein, the flow of fluid from a smaller cross sectional area associated with the second opening to a larger cross sectional area associated with the first opening decreases the pressure of the fluid. A technical effect of having different fluidic chips with different input/output cross sectional areas is use thereof at the same time. The overall tech effect here is that in a known system a time x1 is needed for fluidic chip 1 (e.g., higher pressure) and a time x2 is needed for fluidic chip 2 (lower pressure). With this solution only the time x1 is needed for processing both the fluidic chip 1 and the fluidic chip 2 since the fluidic device adjusts the needed pressure for the fluidic chips on the first side and on the second side.

Optionally, the different cross sectional areas may result from chamfering the various openings to result in different output geometries such as circle, rectangle, triangle, square, and so forth, thereby not limiting the user to perform various fluidic manipulations based on the need of the application.

Alternatively, optionally, the cross sectional area of the first opening on the first side may be equal to the cross sectional area of the second opening on the second side thereby allowing the flow of fluid between the two sides with same pressure. The technical effect is that changing the surface area of inlets and outlets on the first side and the second side makes it possible to construct the flow in the fluidic chip when in use by decreasing the height of the channel and by increasing the length of the channel. By doing so, the broadening of the length makes it easier to use analytical and microscopy tools to inspect the products for quality control and analysis purposes.

Optionally, the fluidic device further comprises at least one integrated fluidic chip having one or more fluidic inlet for receiving one or more fluid respectively;

a third output configured to remove excess one or more fluid from the at least one integrated fluidic chip; and one or more fluidic channel in between the one or more fluidic inlet and the third output, wherein the at least one integrated fluidic chip is aligned with respective latch mechanism for receiving the connector.

In this regard, in an embodiment, the at least one integrated fluidic chip is installed within the fluidic device. The at least one integrated fluidic chip is placed in the at least one fluidic chip holder of the fluidic device for performing fluidic manipulation based on the need of the application. As discussed above, the at least one integrated fluidic chip comprises one or more fluidic inlets and an output, namely the third output, for receiving fluids therein and removing excess fluids therefrom, respectively. Moreover, the one or more fluidic inlets and the third output are connected via the one or more fluidic channels. It will be appreciated that the one or more fluidic channels are integrated within the layers of the at least one integrated fluidic chip while manufacturing thereof. Notably, an integrated fluidic chip installed within the fluidic device will allow the use of the fluidic device instantly (i.e., ready to use) in any of the apparatus, such as by a 3D printer, a robotic arm, or any other clinical test device (as discussed below). The technical effect here is that an integrated fluidic chip makes it possible to get higher throughput and for usage in clean room systems higher grade manufacturing process to get high precision lowest contamination output. Another technical effect is that having all the fluidic chips integrated into one fluidic device makes it easier for the manufacturer to use the fluidic device as a single use production tool for getting less contaminated product.

Optionally, the first and/or second fluidic chip holder is at least one of: a mechanical fastening, a set of protrusions, a set of fluidic protrusions having a groove, a pneumatic holder or a magnetic holder. It will be appreciated that a plurality of fluidic chip holders enables multidimensional fluid manipulation. Moreover, the fluidic chip holders enable a pneumatic (under pressure) or magnetic tightening mechanism to connect each fluidic chip tightly into a corresponding fluidic chip holder. Optionally, the mechanical fastening type fluidic chip holder comprises a groove to hold a fluidic chip therein. Optionally, the fluidic chip holder may be the magnetic holder when the metallic connector is used as a second side. Herein, the pneumatic or magnetic holders makes it possible to fasten the fluidic chip (when in use) much faster because in mechanical fastening a separate tool must be selected by a 3D printer, a robot, and so forth. In this regard, with the pneumatic or the magnetic type fluidic chip holders the fluidic chips are required to be just inserted in the fluidic chip holder, and a pneumatic or a magnetic mechanism tightens the fluidic chip therein and then the fluidic device is ready for use. Beneficially, with the pneumatic or the magnetic type fluidic chip holders no mechanical screw, finger, or hook connector mechanism is needed.

Optionally, with a device or with an apparatus one can use fluidic chips of various manipulations to be integrated in multiple selectable positions, for an example, one fluidic chip can do a flow focusing and another fluidic chip can be used for droplet formation or emulsion formation and the extrude can also be used as inlet as well. Beneficially, only one sub-system for specific use is needed as the fluidic chip position can be selected where the sub-system is present thus saving number of components and power.

In an exemplary implementation, the fluidic device may be designed as a vertical device comprising vertically arranged plurality of fluidic chip holders. The fluidic chips are arranged vertically in the corresponding vertically arranged fluidic chip holders. In such case, the connector is arranged perpendicular, i.e. in a horizontal direction, to the vertically arranged plurality of fluidic chip holders.

The present disclosure also relates to the apparatus as described above. Various embodiments and variants disclosed above apply mutatis mutandis to the apparatus.

The term "apparatus" refers to a system employing the aforementioned fluidic device for performing fluidic manipulation for various applications as needed. Optionally, the fluidic device comprises:

- a first latch mechanism for receiving a connector, the first latch mechanism arranged on the first side;
- a first fluidic chip holder for holding a first fluidic chip, the first fluidic chip holder arranged on the first side in an alignment with the first latch mechanism;
- a second latch mechanism for receiving the connector, the second latch mechanism arranged on the first side;
- a second fluidic chip holder for holding a second fluidic chip, the second fluidic chip holder arranged on the first side in an alignment with the second latch mechanism; wherein the first latch mechanism and the second latch mechanism are arranged spatially in different positions on the first side; and
- a traction surface to couple the fluidic device with an actuator to move the fluidic device to select which of the first or the second fluidic chip is to be used.

The term "at least one source material" refer to a fluid that may be an analyte, a drug, a toxin, a pollutant, a chemical, a biomaterial (such as a human cell, blood sample, microorganisms, and the like), and so forth. Each of the source materials are stored in a specific container that may be suitable (namely, structurally compatible) for containing and storing such source material. In other words, there may be several containers for storing the specific source materials therein. The term "tubular material feeding line" as used herein refers to a channel for supplying the source material from its container to the connector that aligns with the first and second fluidic chip held in the first and second fluidic chip holders via the first and second latch mechanisms, respectively, for supplying the source material thereto through one or more inlet tubes thereof. The term "tubular printing composition feeding line" as used herein refers to a channel that provides communication between the target tool and the connector that is configured to supply the printing material from the first and second fluidic chip held in the first and second fluidic chip holders, respectively, to the target tool through one or more outlet tubes thereof. Herein, the first and second ends are associated with the tubular material feeding line and the third and fourth ends are associated with the tubular printing composition feeding line. Optionally, the target tool may be for example a 3D printing head, a medicine test device, medical instruments for measuring, sensing (e.g. liquid flowrate), and analyzing the source material. Optionally, the printing composition may be any fluid such as a hydrogel material, drugs, a mixture of two or more source materials, and so forth. Optionally, the fluidic device is connected to the apparatus through pressure controller unit and other fluidic automation systems connected to a pneumatics unit for providing pressure. The term "actuator" as used herein refers to a movement mechanism configured to move the fluidic device to select which of the at least two latch mechanisms receive the connector at the time. Optionally, the actuator is implemented as a motor. Optionally, the motor may include an encoder to detect exact position of the at least one latch mechanism with respect to the connector.

Optionally, the apparatus is a printer, a robot or a clinical test device. In an example, the printer may be a multidimensional printer, such as a 3D printer. In another example, the apparatus may be a robotic arm that employs the fluidic device to perform fluidic manipulations for various applications. Notably, the apparatus implemented as a printer, a robot or a clinical test device is configured to control the fluidic device.

The apparatus further comprises a controller unit for controlling the aforementioned functions associated with the apparatus. The term "controller unit" refers to hardware and/or software that is operable to implement specific algorithms therein, to perform specific operations associated with performing 3D printing of objects (such as for starting the manufacturing or the bio-printing process, ending the manufacturing or the bio-printing process, controlling an amount of material to be dispensed from the printer head and so forth). The controller unit employs a processor configured to perform the abovementioned operations. It will be appreciated that optionally the processor includes, but is not limited to, a microprocessor, a microcontroller, a complex instruction set computing (CISC) microprocessor, a reduced instruction set computer (RISC) microprocessor, a very long instruction word (VLIW) microprocessor, or any other type of processing circuit. The controller unit is operatively coupled to an axis system, a scale, a flow sensor and to a printing surface, a printing head, an electric and pneumatics unit, and so forth to perform the abovementioned specific operations.

Optionally, the fluidic chip comprises

- one or more fluidic inlets for receiving at least one fluid from the tubular material feeding line of the connector;
- a third output configured to remove excess fluid from the fluidic chip, in use to the tubular printing composition feeding line; and
- one or more fluidic channel in between the one or more fluidic inlets and the third output to form the printing composition from the received at least one fluid.

In this regard, the fluidic chip comprises one or more fluidic inlets and a third output for receiving at least one fluid from at least one source material from the container via the tubular material feeding line of the connector and remove excess fluid therefrom via the tubular printing composition feeding line that leads to the target tool, respectively. Moreover, the one or more fluidic inlets and the third output are connected via the one or more fluidic channel though which the printing composition is transferred to the target tool for further use.

Optionally, the apparatus further comprises an imaging system. The imaging system enables analyzing and manipulating the fluid flow. Moreover, the imaging system enables monitoring the flow (or manipulations of the fluid flow) and sending information to the controller unit for other operations, such as heating, cooling, and so forth. In this regard, for manipulating the fluid flow, the imaging arrangement is configured for selecting a right type of printing material, an amount to be printed to get a desired final product. Moreover, the quality of the fluid is monitored, and information sent to the controller unit if a heating/cooling is needed to keep the fluidic material still valid for use. Optionally, the imaging unit is configured to monitor all the fluidic chips at once or monitor each fluidic chip separately.

Optionally, the apparatus comprises a cooling sub-system, a heating sub-system, an ultrasonic sub-system, an electromagnetic sub-system, and a sensor sub-system. The sensor sub-system comprising a temperature sensor, a luminance sensor, a spectrometric sensor, and so forth. The cooling sub-system, the heating sub-system, the ultrasonic sub-system, the electromagnetic sub-system and the sensor sub-system may be arranged above or below the fluidic device in a horizontal fluidic chip arrangement or on the inner or outer sides in a vertical fluidic chip arrangement. Moreover, the sensor sub-system is configured to monitor all the fluidic chips at once or each fluidic chip separately.

The imaging arrangement rotates the fluidic chip under or above the cooling sub-system, the heating sub-systems, the ultrasonic sub-systems, and the electromagnetic sub-system to cool the fluid to temperatures in a range from −20 to 500° C., heat the fluid as per the application, to disaggregate or make the particles mono disperse, and subject the fluid to different wavelengths depending on the fluid as well as to irradiate the fluid as per the application (such as to enable crosslinking of Poly Lactic Glycolic Acid, Gelatin methacrylate materials need either UV (150-450) or IR (800-1050), respectively. Moreover, the temperature sensor is configured to monitor all the fluidic chips at once or each fluidic chip separately. Optionally, the temperature sensor may be a conventional 1D system or a 3D IR. The luminance sensor is configured to measure the intensity of light and can be used for image stabilization of the imaging arrangement output. The spectrometric sensor is configured to measure different wavelengths and give feedback for quality control and other analysis.

In an implementation, the fluidic chips are incorporated inside the apparatus and the position of the fluidic chips are read by the encoder and aligned by the imaging arrangement in such a way that the connector connects to the encoded fluidic chip. Subsequently, the heating, electromagnetic, cooling or ultrasonic sub-systems operate on the fluid based on the manipulation user needs. For example, a temperature is measured with a temp sensor. If a temperature is approaching a below limit value of one specific chip x in a position y, then operation is paused, and the chip x is rotated to a position where a heater sub-system is located in position z. When the temp of the chip x is again within the acceptable limits in position z the chip is rotated back to its origin position y and normal manipulation continues. Similar type of operation can be used with other sub-systems. A general technical effect for different sub-systems is that only one sub-system for each specific use is needed as the fluidic chip position can be selected where the sub-system is present, thus saving number of components and power.

In an exemplary use case in Bio/Lifesciences field, the apparatus may be used for bioprinting with multiple cells and materials with one single printing head tool without manual replacements of the cells, biomaterials and other additives. The apparatus can be used to print diagnostic tools which can incorporate the ligands, substrate or enzymes which are required for quantifying the analytes which can be biological entity or non-biological entity such as toxins or toxic materials. Moreover, the apparatus can be used for live cell encapsulations and genetic modification of the cells to express particular triat and can be used in printing, dosing, or as a bio-pen application. Furthermore, the apparatus can be used in detection of seeds and can be used to encapsulate those seeds with beneficial nutrients, pesticide and hormones for healthy and higher yields in agriculture sector. Additionally, the apparatus can be used to produce personalized cosmetics.

In another exemplary use case in Pharma field, the apparatus can be used in production of nanoparticles, personalized medicine with multiple or flexible formulation which would increase the efficacy and give user easy or multiple way of administering it.

It will be appreciated that in the above applications (Bio/Lifesciences/Pharma), the apparatus may be coupled to illumination arrangement comprising blue or UV light. In such use case, the fluidic devices with inbuilt fluidic chip(s) are disinfected and an external infection is minimized that is important in pharma, bio industry.

In yet another exemplary use case besides Bio/Lifesciences/Pharma field, the apparatus can be used in making composites for human body parts replacements such as bones with personalized growth factors and other biological entities which makes it non bio eliminable by the host immune system.

The present disclosure also relates to the method as described above. Various embodiments and variants disclosed above apply mutatis mutandis to the method.

The method comprises arranging a first and a second fluidic chip on a first side of a fluidic device at spatially different positions. The term "arranging" as used herein refers to placing the first and the second fluidic chip on the first and the second fluidic chip holders, respectively, spatially positioned on the first side of the fluidic device. Moreover, the method comprises moving the fluidic device to a first relative position in respect to a connector to select the first fluidic chip to perform a fluidic manipulation as required. It will be appreciated that the fluidic device is moved automatically without a manual intervention to prevent cross-contamination of the first fluidic device and content therein as well as improve production efficiency of the fluidic device and the apparatus using the same. Subsequently, the method comprises moving the fluidic device to a second relative position in respect to the connector to select the second fluidic chip once the purpose of the first fluidic chip in the application is achieved. It will be appreciated that similar to the first movement of the fluidic device, the fluidic device is also moved the second time automatically without a manual intervention to prevent cross-contamination of the second fluidic device and content therein as well as improve production efficiency of the fluidic device and the apparatus using the same. The connector provides source material for the selected fluidic chip and receives the printing composition from the selected fluidic chip. As discussed above, the connector supplies the fluid and printing material for the desired applications of fluidic manipulation.

DETAILED DESCRIPTION OF DRAWINGS

Figure 1B:
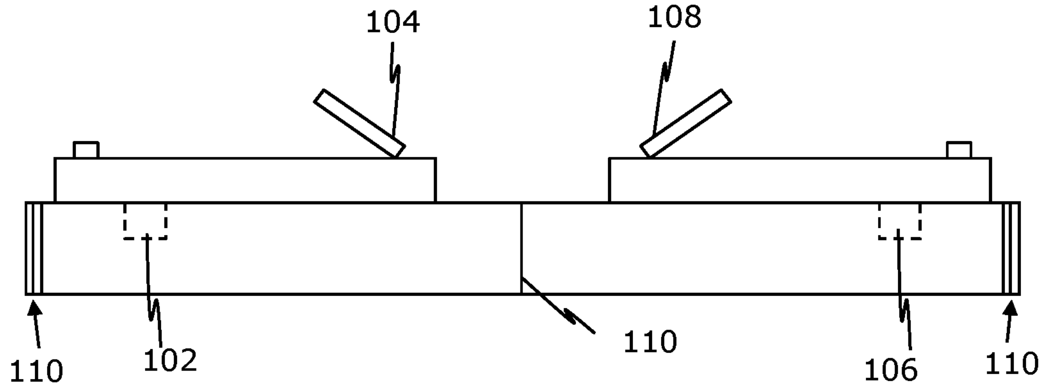
Figure 2A:
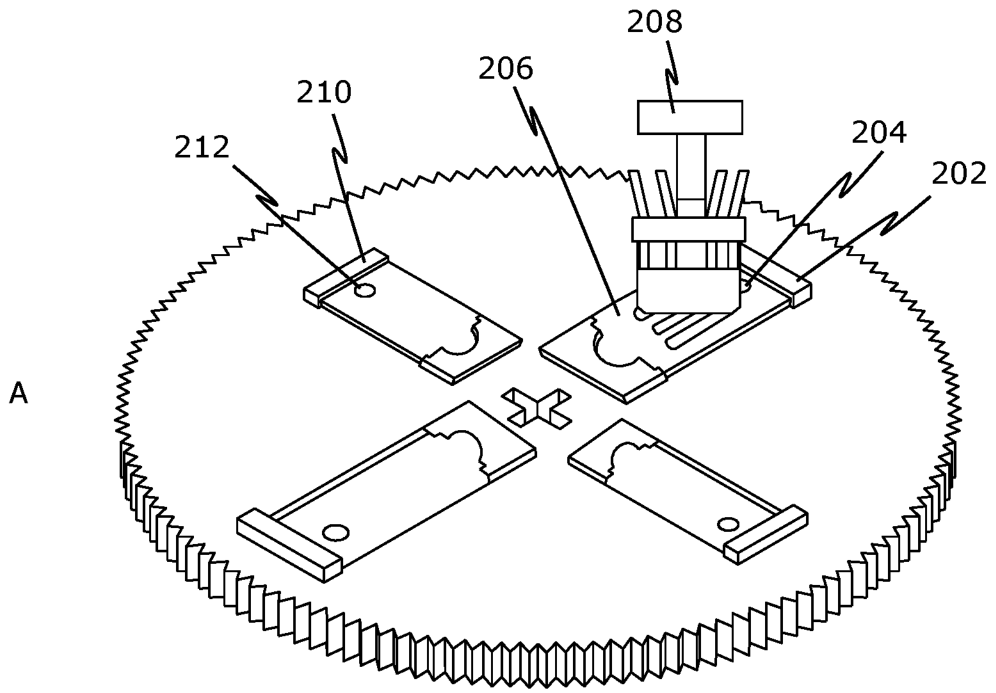
FIGS. 2A, 2B, 2C and 2D are a schematic illustration of different positions A, B, C and D, respectively, of a fluidic device, when in use, in accordance with an embodiment of the present disclosure.
Figure 2B:
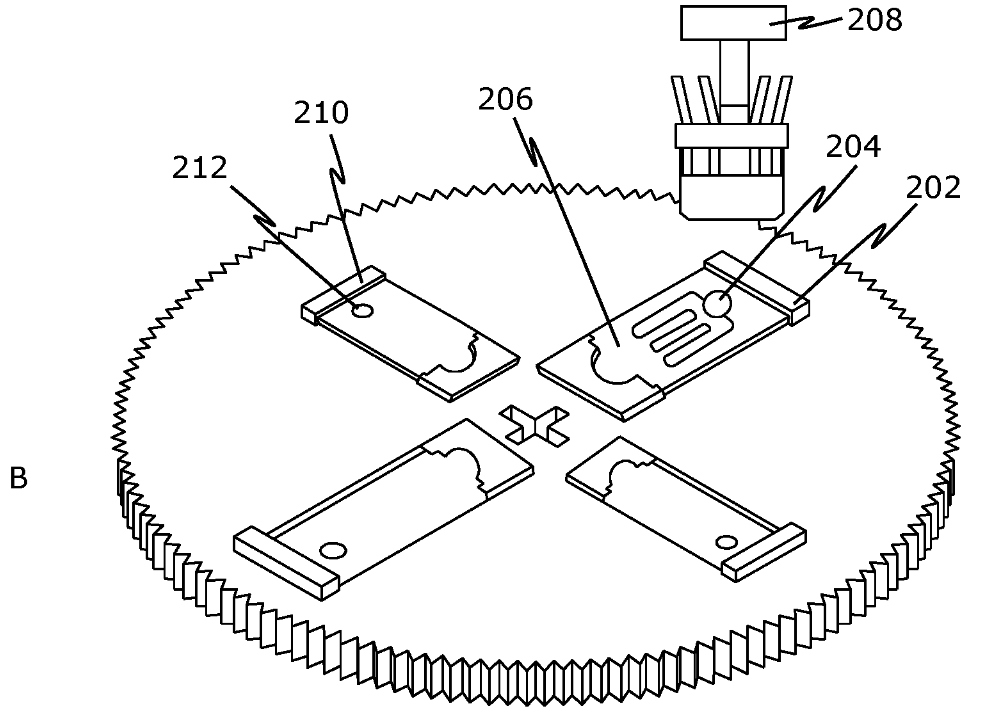
Figure 2C:
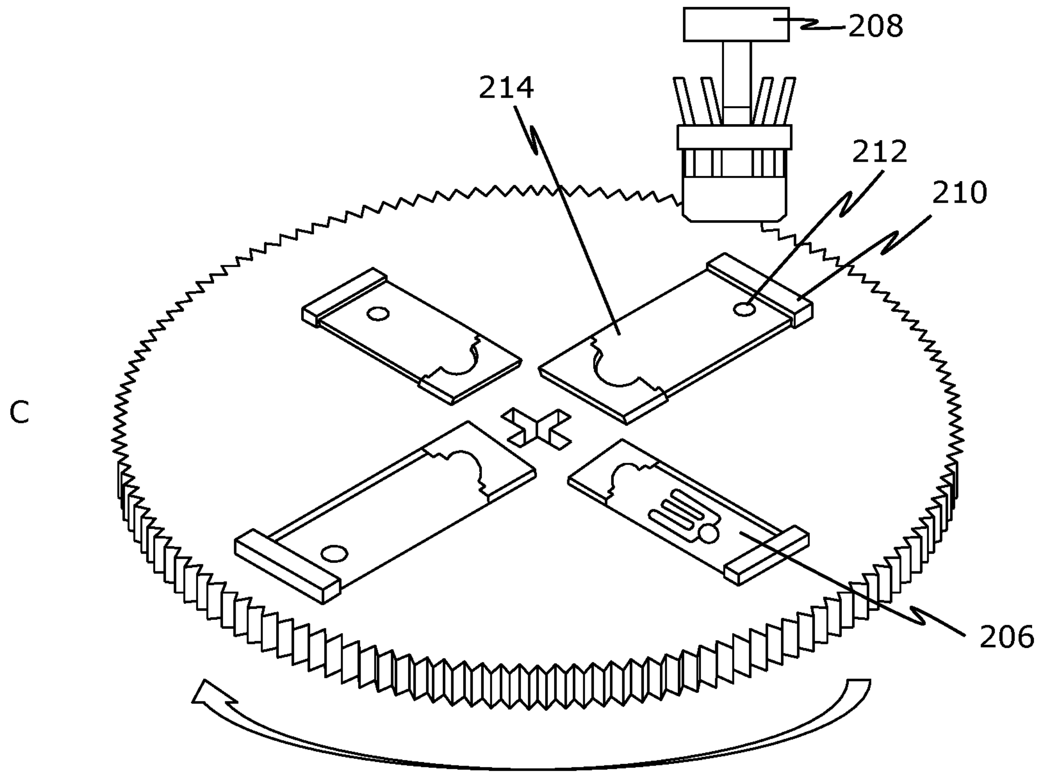
Figure 2D:
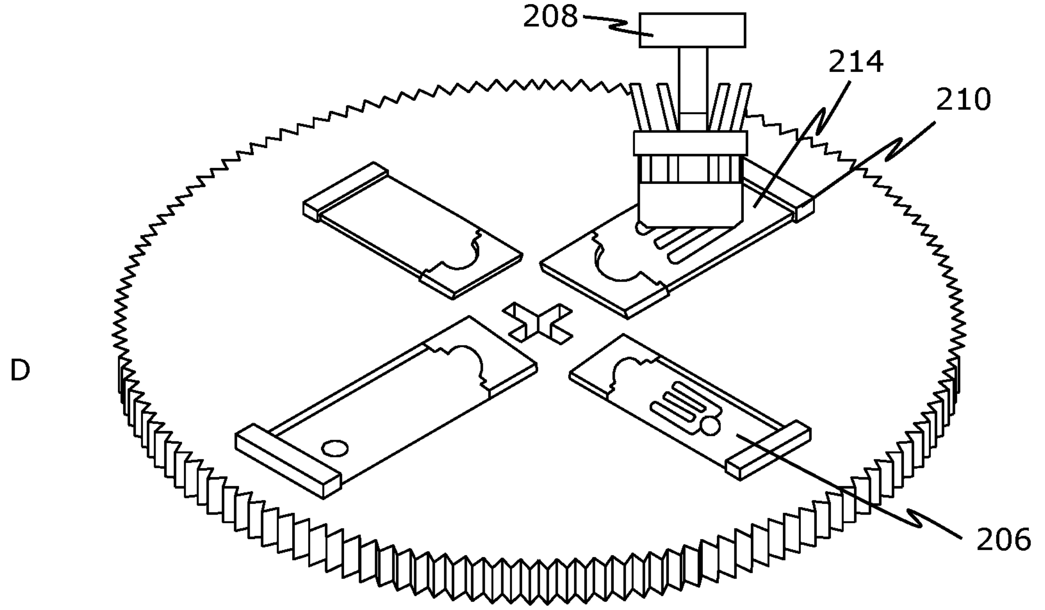

Referring to FIGS. 1A and 1B, there are shown a perspective view and a side view, respectively, of a fluidic device 100, in accordance with an embodiment of the present disclosure. The fluidic device 100 having a first side 100A and a second side 1008 opposite to the first side 100A comprises a first latch mechanism 102 for receiving a connector (not shown), the first latch mechanism 102 arranged on the first side 100A and a first fluidic chip holder 104 for holding a first fluidic chip (not shown), the first fluidic chip holder 104 arranged on the first side 100A in an alignment with the first latch mechanism 102. Moreover, the fluidic device 100 comprises a second latch mechanism 106 for receiving the connector, the second latch mechanism 106 arranged on the first side 100A and a second fluidic chip holder 108 for holding a second fluidic chip (not shown), the second fluidic chip holder 108 arranged on the first side 100A in an alignment with the second latch mechanism 106, wherein the first latch mechanism 102 and the second latch mechanism 106 are arranged spatially in different positions on the first side 100A. Furthermore, the fluidic device 100 comprises a traction surface 110 to couple the fluidic device 100 with an actuator 112 to move the fluidic device 100 to select which of the first or the second fluidic chip is to be used. Additionally, the fluidic device 100 further comprises at least one holder 114 for an encoder (not shown), wherein the encoder is operatively coupled to the actuator 112 to detect the position of the fluidic device 100 during movement of the fluidic device 100 to select which one of the first fluidic chip and the second fluidic chip is to be used. The traction surface 110 is arranged on any one of: the first side 100A, the second side 1008, an outer periphery 100C, or in a middle 100D of the fluidic device 100.

Referring to FIGS. 2A, 2B, 2C and 2D, there is shown a schematic illustration of different positions A, B, C and D, respectively, of a fluidic device 200, when in use, in accordance with an embodiment of the present disclosure. The fluidic device 200 is similar to the fluidic device 100 of FIG. 1A, wherein the fluidic device 200 comprises 4 fluidic chip holders, such as a first fluidic chip holder 202 and a second fluidic chip holder 210, wherein the first fluidic chip holder 202 and the first latch mechanism 204 is arranged to align and couple at least one input (not shown) and at least one output (not shown) of the first fluidic chip 206 with the connector 208 when the fluidic device 200 is in a first position (A) when in use. In this regard, the connector 208 is centered to first latch mechanism 204, pushing the first fluidic chip 206 towards the fluidic device 200. The first fluidic chip 206 is tightened between the connector 208 and the fluidic device 200. Moreover, in position (B) i.e., when operation is done with the first fluidic chip 206 the connector 208 is released by opening a screw (using a separate tool to open the screw coupled to latch mechanism) and the connector 208 is moved up over the fluidic device 200. Furthermore, the fluidic device 200 comprises a second chip holder 210, When the connector 208 is in up-position, the fluidic device 200 is rotated and the second fluidic chip holder 210 and the second latch mechanism 212 is arranged to align position (C) and couple at least one input and at least one output of the second fluidic chip 214 with the connector 208 when the fluidic device 200 is in a second position (D) when in use.

Figure 3A:
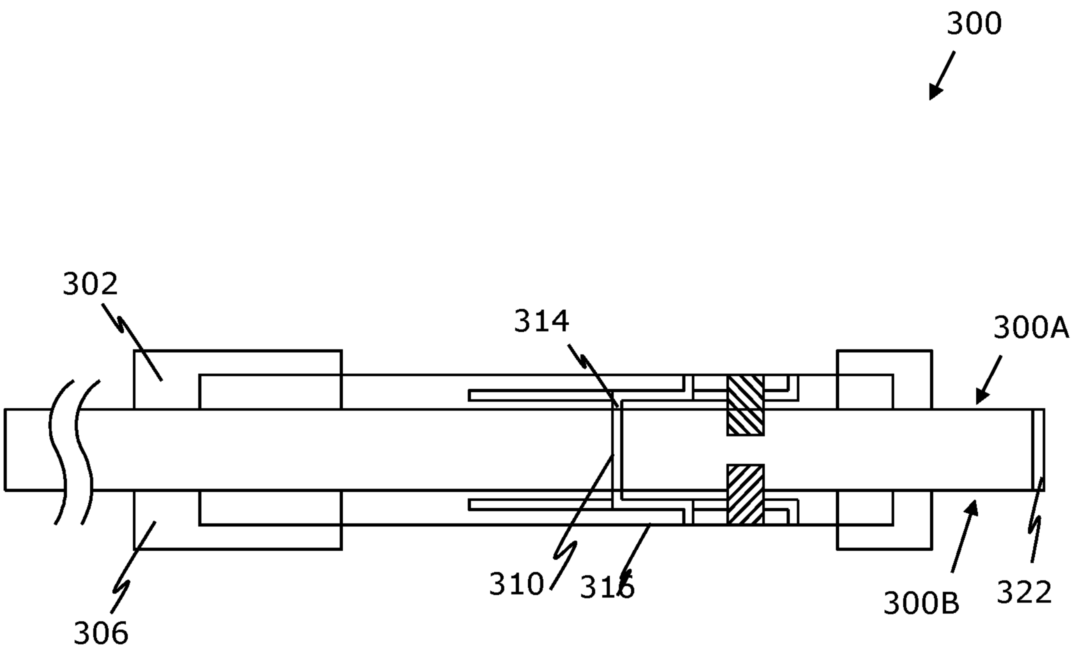
FIGS. 3A and 3B are side views of a fluidic device, in accordance with different embodiments of the present disclosure.
Figure 3B:
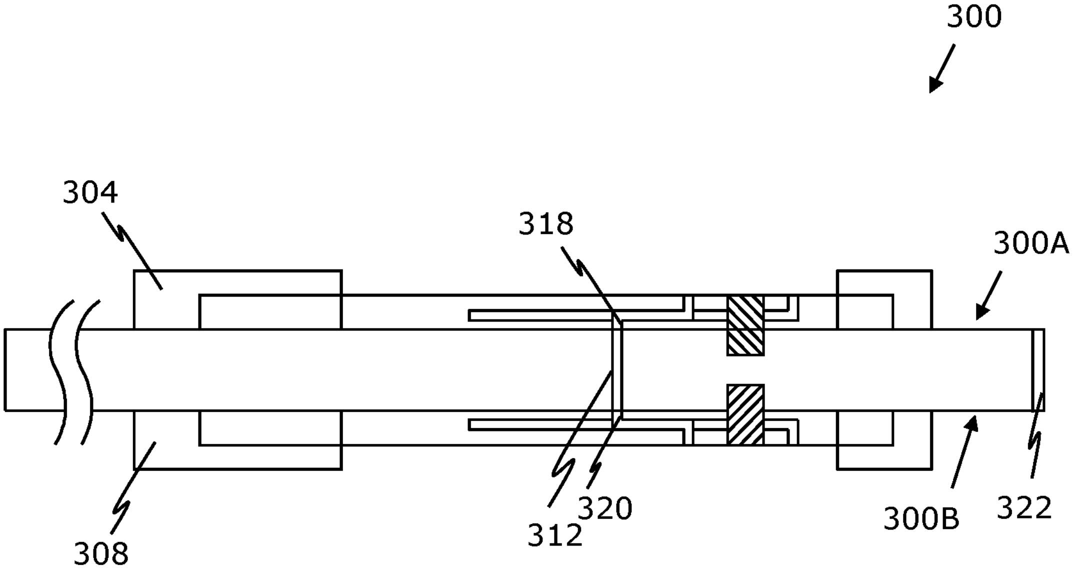

Referring to FIGS. 3A and 3B, there is shown a side view of a fluidic device 300, in accordance with an embodiment of the present disclosure. The fluidic device 300 comprises a first fluidic chip holder 302 and a second fluidic chip holder 304 on a first side 300A. The fluidic device 300 comprises at least one additional latch mechanism (not shown) and fluidic chip holder (306, 308) arranged on the second side 300B. Moreover, the fluidic device 300 comprises a first fluid channel 310 and a second fluid channel 312 are embedded inside of the fluidic device 300. Furthermore, the first fluid channel 310 has a first opening 314 on the first side 300A and a second opening 316 on the second side 300B and the first fluid channel 310 is between the first opening 314 and the second opening 316, and the second fluid channel 312 has a third opening 318 on the first side 300A and a fourth opening 320 on the second side 300B and the second fluid channel 312 is between the third opening 318 and the fourth opening 320. Additionally, the fluidic device 300 comprises a traction surface 322 to couple the fluidic device with an actuator (not shown) to move the fluidic device 300.

Figure 4:
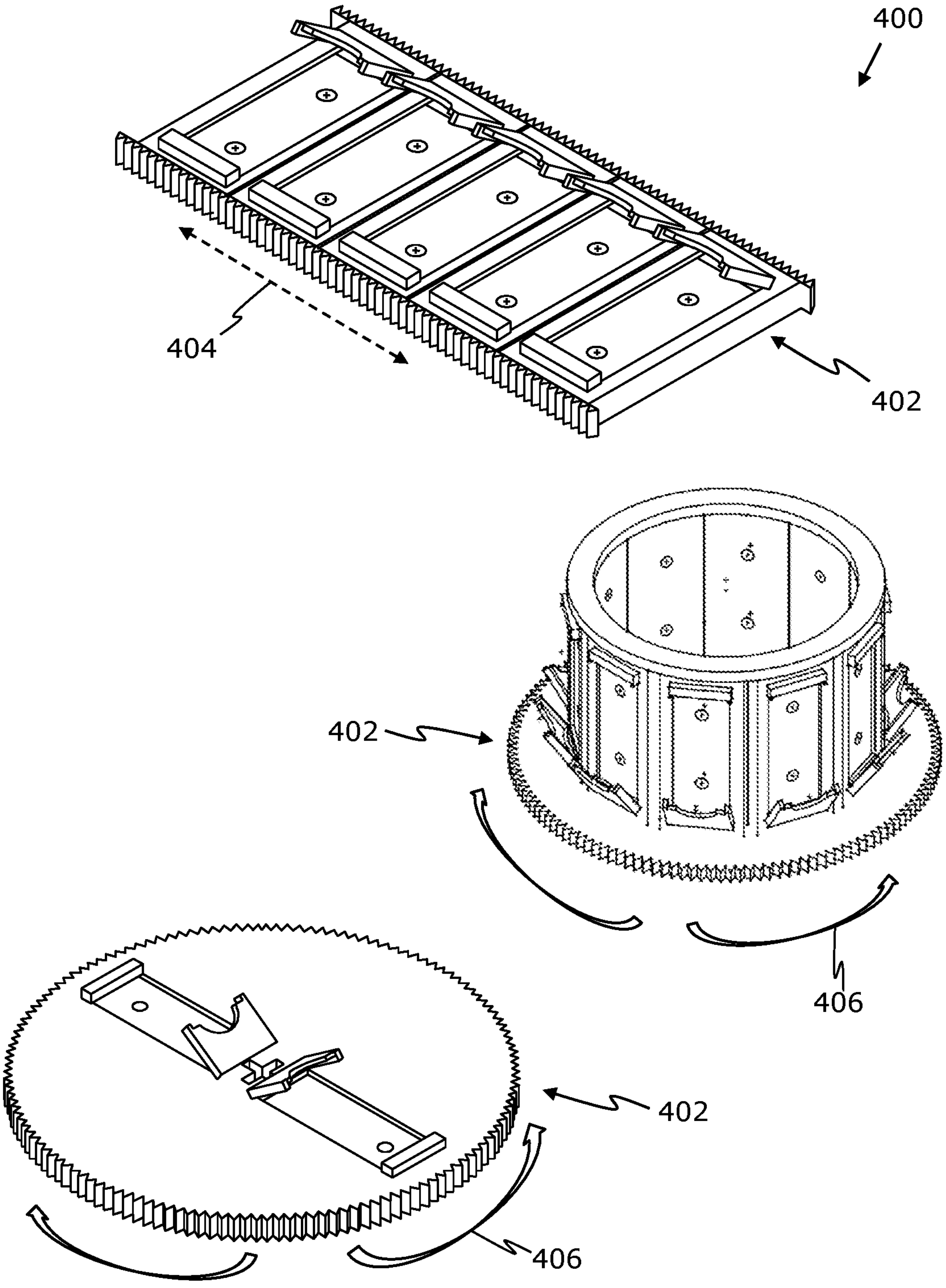
FIG. 4 is a schematic illustration of an embodiment of a traction surface and a type of movement of a fluidic device, when in use, in accordance with an embodiment of the present disclosure.

Referring to FIG. 4, there is shown a schematic illustration of an embodiment of a traction surface 400 and a type of movement of a fluidic device 402, when in use, in accordance with an embodiment of the present disclosure. The traction surface 400 is a gear-tooth mechanism or a pulley-mechanism. Moreover, the movement is one of: a linear movement 404 or a rotational movement 406. Furthermore, the fluidic device 402 may be implemented in a linear shape, a CD shape, and a vertical cylindrical shape.

Figure 5:
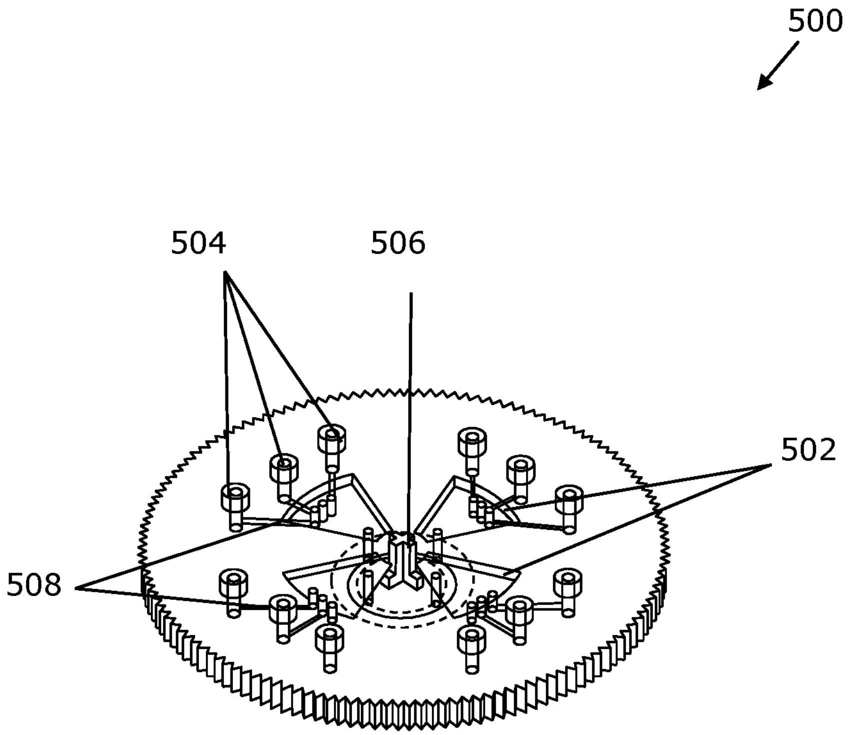
FIG. 5 is an exemplary implementation of a fluidic device, in accordance with an embodiment of the present disclosure.

Referring to FIG. 5, there is shown an exemplary implementation of a fluidic device 500, in accordance with an embodiment of the present disclosure. The fluidic device 500 further comprises at least one integrated fluidic chip 502 having one or more fluidic inlet 504 for receiving one or more fluid respectively and a third output 506 configured to remove excess one or more fluid from the at least one integrated fluidic chip 502. Moreover, the fluidic device 500 further comprises one or more fluidic channel 508 in between the one or more fluidic inlet 504 and the third output 506, wherein the at least one integrated fluidic chip 502 is aligned with respective latch mechanism for receiving a connector.

Figure 6:
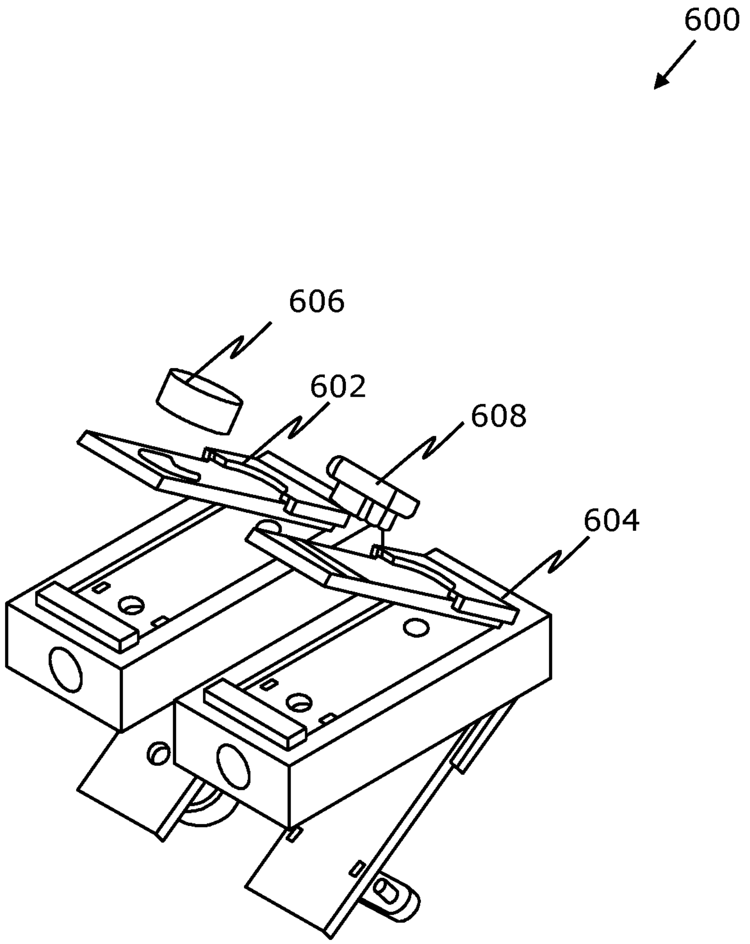
FIG. 6 is a schematic illustration of a holding mechanism for fastening a fluidic chip, in accordance with an embodiment of the present disclosure.

Referring to FIG. 6, there are shown schematic illustrations of holding mechanisms 600 for fastening a fluidic chip (not shown) with the fluidic chip holder, in accordance with an embodiment of the present disclosure. As shown a first fluidic chip holder 602 and a second fluidic chip holder 604 having holding mechanism to hold the connector. The first fluidic chip holder 602 has a magnetic holder 606 and the second fluidic chip holder 604 has a pneumatic holder 608.

Figure 7:
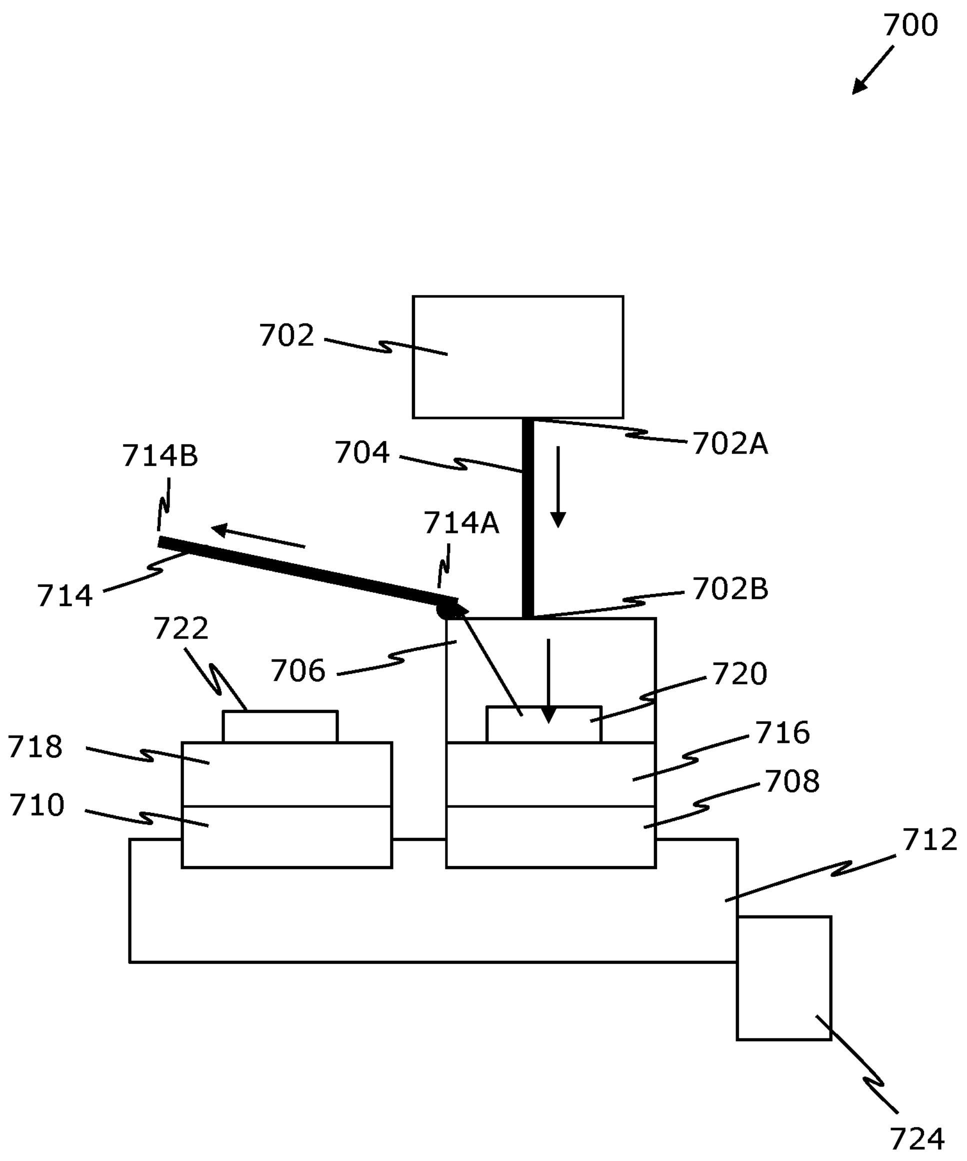
FIG. 7 is a schematic illustration of an apparatus, in accordance with an embodiment of the present disclosure.

Referring to FIG. 7, there is shown a schematic illustration of an apparatus 700, in accordance with an embodiment of the present disclosure. The apparatus 700 comprises a container 702 for at least one source material (not shown), a tubular material feeding line 704 connected to the container 702 from a first end 702A and having a connector 706 on the second end 702B, wherein the connector 706 is selectable removably connectable to one latch mechanism (708, 710) at the time of at least two latch mechanisms (708, 710) of a fluidic device 712. Moreover, the apparatus 700 comprises a tubular printing composition feeding line 714 connected to the connector 706 from a third end 714A and to a target tool (not shown) from a fourth end 714B, wherein a printing composition for the target tool is formed in a fluidic chip (720, 722) assembled in a fluidic chip holder (716, 718) of the fluidic device 712 and the connector 706 is fluidly connected to the fluidic chip when in use. Furthermore, the apparatus 700 comprises an actuator 724 configured to move the fluidic device to select which of the at least two latch mechanisms (708, 710) receive the connector 706 at the time.

Figure 8:
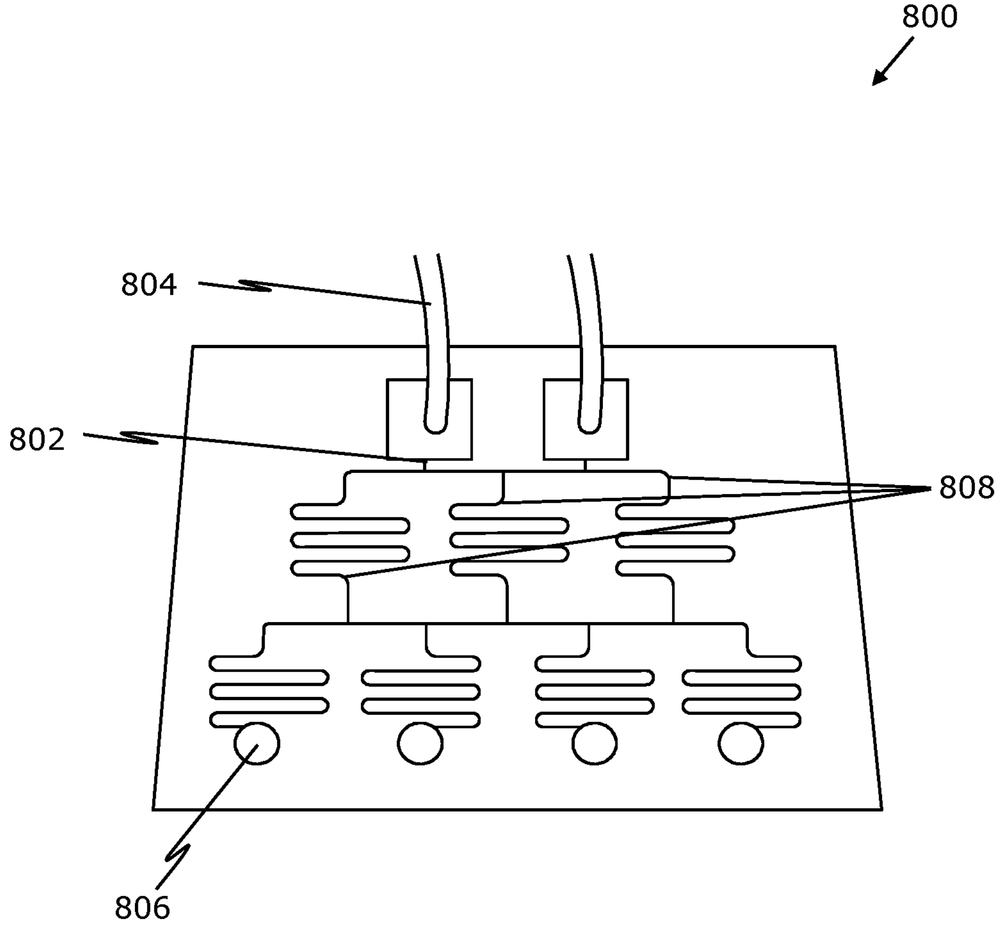
FIG. 8 is a schematic illustration of a fluidic chip, in accordance with an embodiment of the present disclosure.

Referring to FIG. 8, there is shown a schematic illustration of a fluidic chip 800, in accordance with an embodiment of the present disclosure. The fluidic chip 800 comprises a first fluidic inlet 802 for receiving at least a first fluid from the tubular material feeding line 804 of the connector (not shown) and a first output 806 configured to remove excess fluid from the fluidic chip 800, in use to the tubular printing composition feeding line 804. Moreover, the fluidic chip 800 comprises one or more fluidic channel 808 in between the first fluidic inlet 802 and the first output 806 to form the printing composition from the received at least first fluid.

Figure 9:
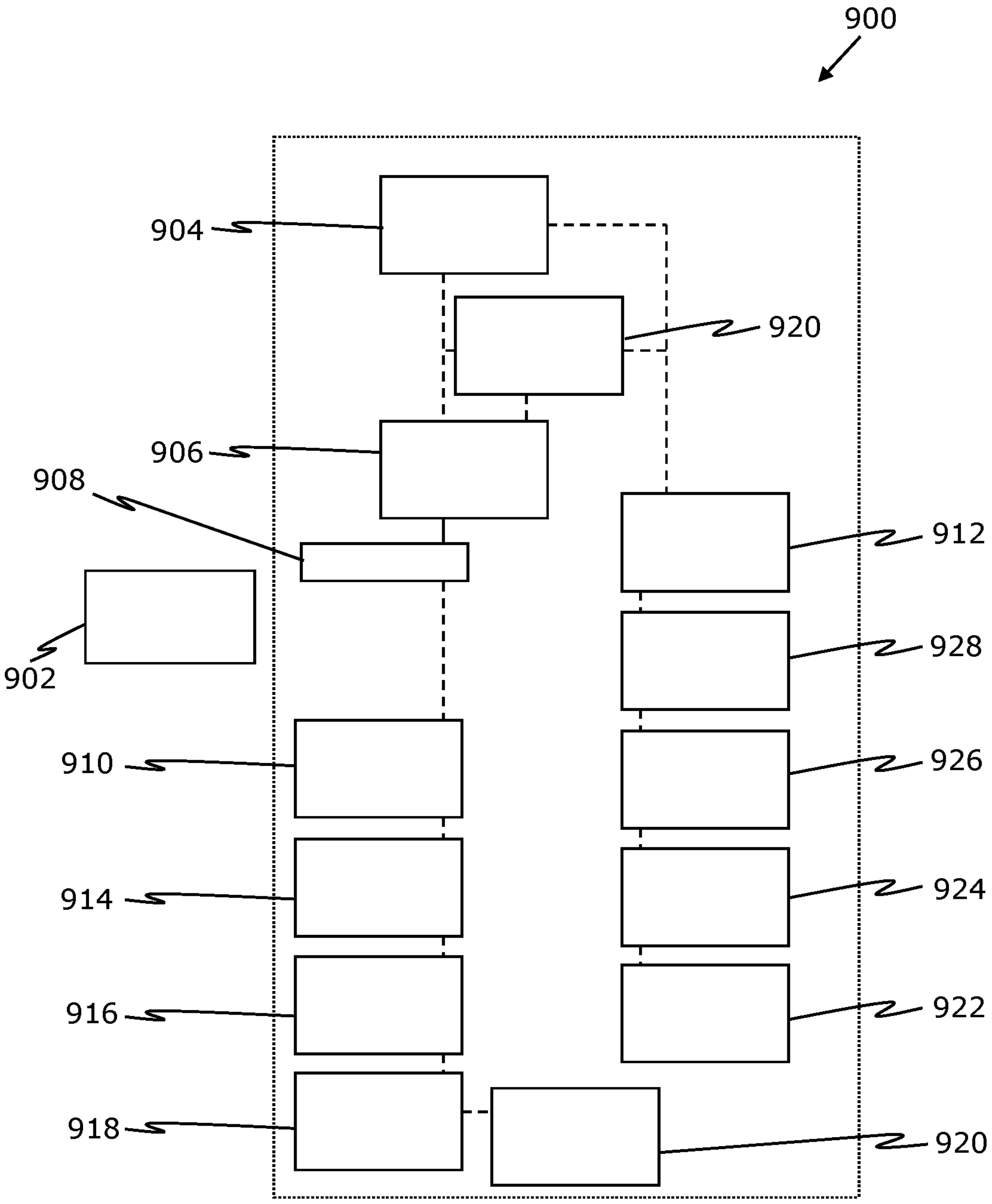
FIG. 9 is an exemplary schematic illustration of an apparatus comprising a fluidic device, in accordance with an embodiment of the present disclosure.

Referring to FIG. 9, there is shown an exemplary schematic illustration of an apparatus 900 comprising a fluidic device 902, in accordance with an embodiment of the present disclosure. The apparatus is a printer, a robot or a clinical test device. Moreover, the apparatus comprises a container 904 for at least one source material, a connector 906, at least one latch mechanism 908, and the fluidic device 902 arranged in between the apparatus. Furthermore, the apparatus comprises a holder 910 for an encoder 912, a heater sub-system 914, a cooler sub-system 916, an ultrasonic sub-system 918, an electromagnetic sub-system 920, a spectrometric sensor 922, a luminance sensor 924, a temperature sensor 926, a camera 928, and an electrical and pneumatic unit 930 arranged sequentially and working in conjunction with each other in a closed loop (depicted as a dotted line).

Figure 10:
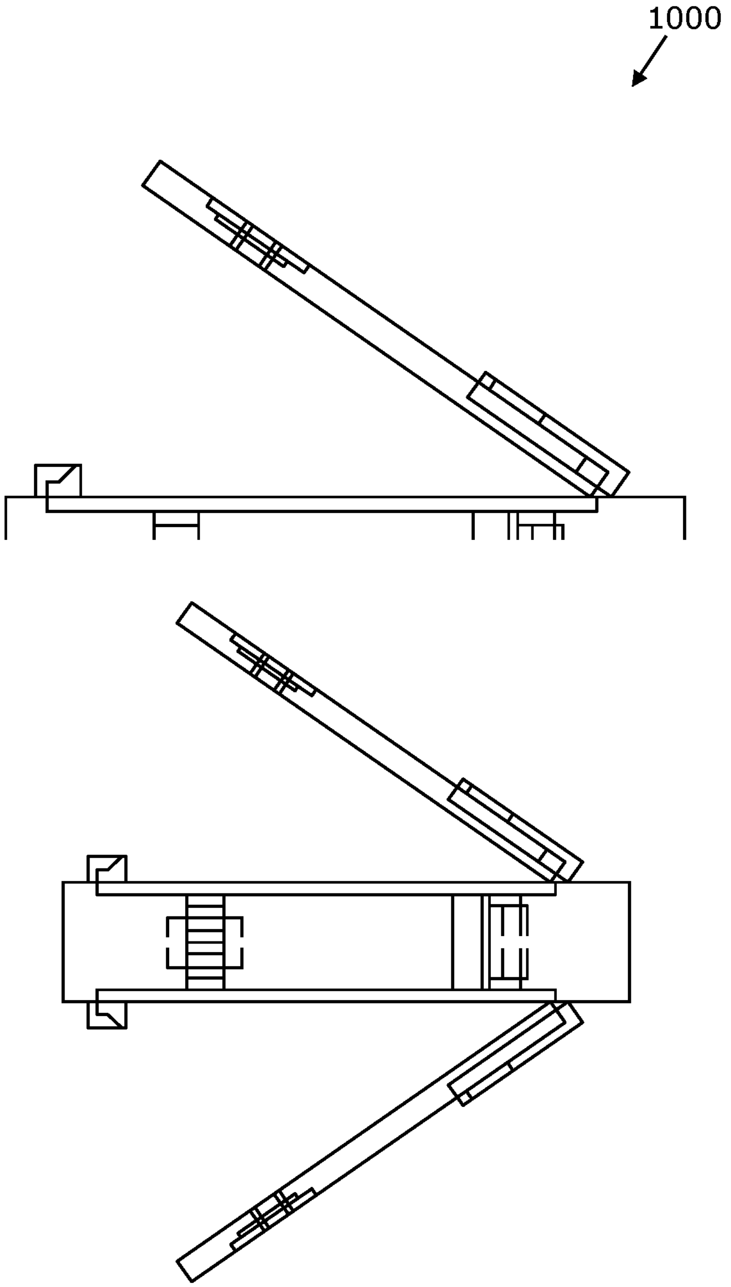
FIG. 10 is an exemplary schematic illustration of a double side configuration of a fluidic device, in accordance with an embodiment of the present disclosure.

Referring to FIG. 10, there is shown an exemplary schematic illustration of a double side configuration of a fluidic device 1000, in accordance with an embodiment of the present disclosure. In this regard, the fluidic device 1000 may comprise at least one latch mechanism on both sides for fastening a connector (not shown).

Figure 11:
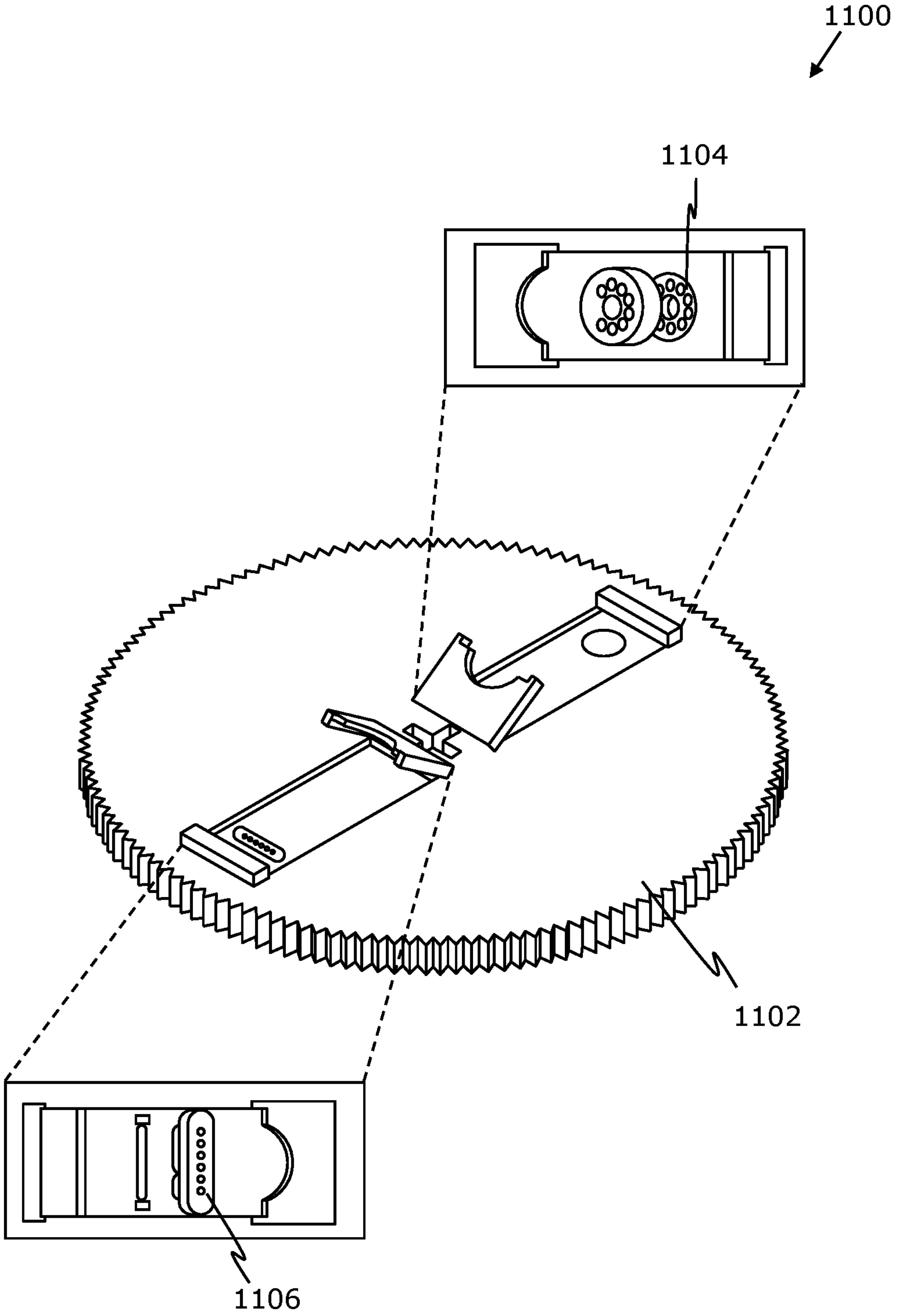
FIG. 11 is an exemplary schematic illustration of at least one latch mechanism in a fluidic device, in accordance with an embodiment of the present disclosure.
Figure 12A:
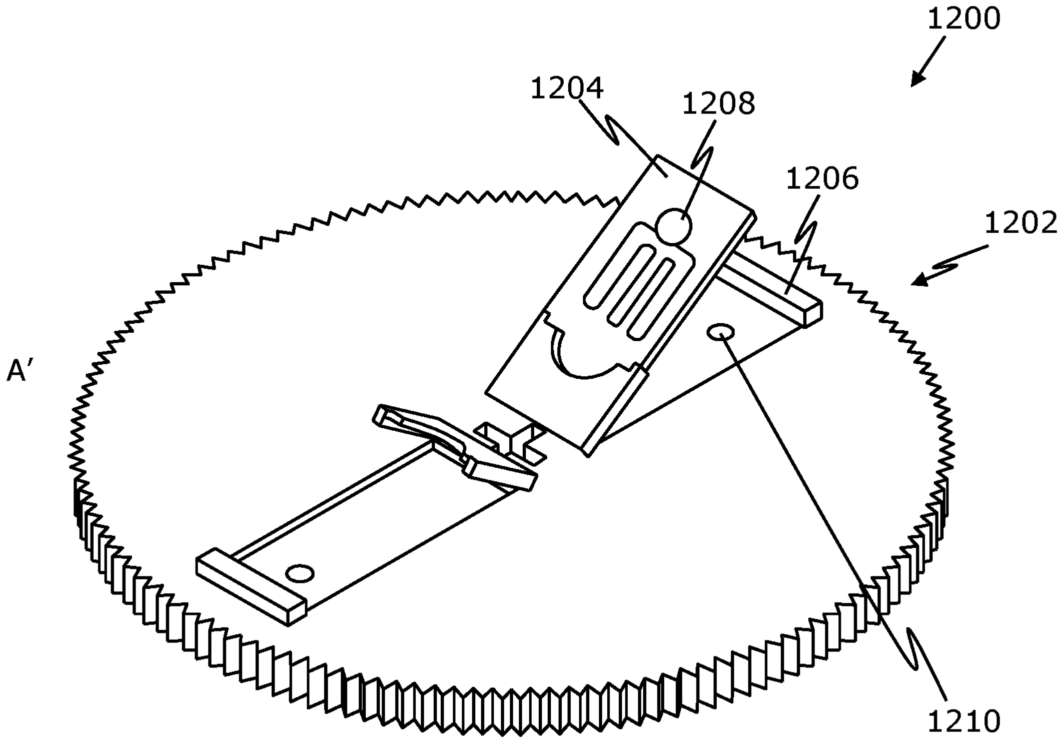
FIGS. 12A, 12B, 12C and 12D are an exemplary schematic illustration of inserting an external fluidic chip in a fluidic device, in accordance with an embodiment of the present disclosure.
Figure 12B:
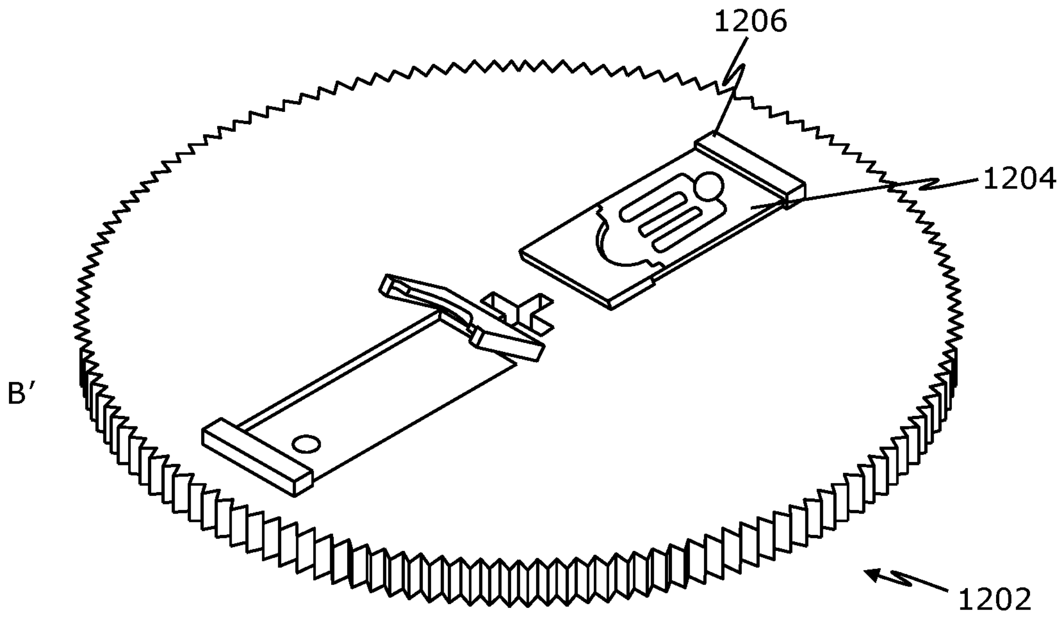
Figure 12C:
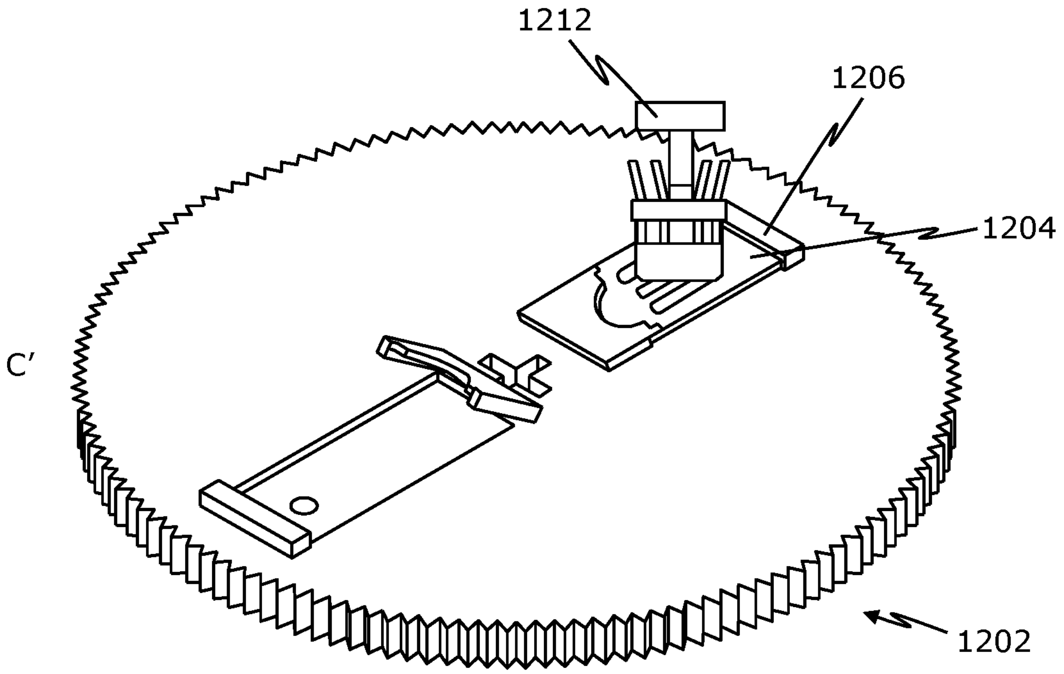
Figure 12D:
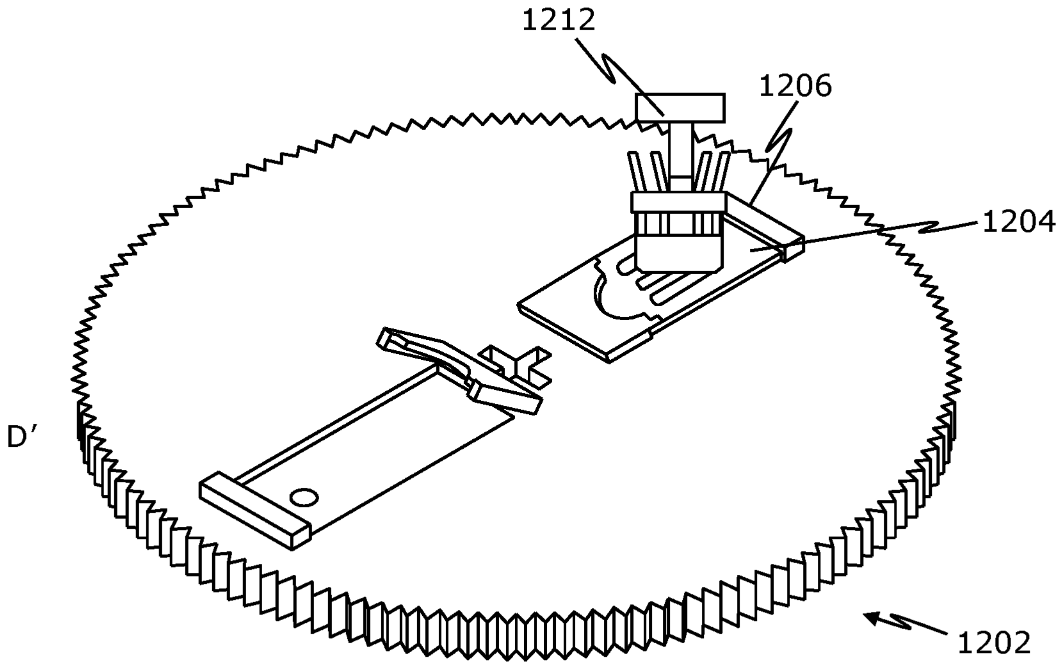

Referring to FIG. 11, there is shown an exemplary schematic illustration of at least one latch mechanism 1100 in a fluidic device 1102, in accordance with an embodiment of the present disclosure. In this regard, the at least one latch mechanism may be a circular latch mechanism 1104, or a linear latch mechanism 1106.

Referring to FIGS. 12A, 12B, 12C and 12D, there is shown an exemplary schematic illustration of inserting an external fluidic chip 1200 in a fluidic device 1202, in accordance with an embodiment of the present disclosure. In this regard, at position A', the fluidic chip 1204, when in use, is inserted into a microfluidic chip holder 1206. At position B', the fluidic chip is turned down such that the hole 1208 in the fluidic chip and the hole 1210 on at least one latch mechanism is in alignment with each other. At position C', a connector 1212 is used and is centered to the hole 1210 on the at least one latch mechanism, pushing the fluidic chip 1204 towards the fluidic device 1202. At position D', the connector 1212 is tightening the fluidic chip 1204. Moreover, an apparatus (not shown) tightens the connector 1212 into the fluidic chip 1204 using a tightening such as a screw tool, a hook type, or a finger type.

Figure 13:
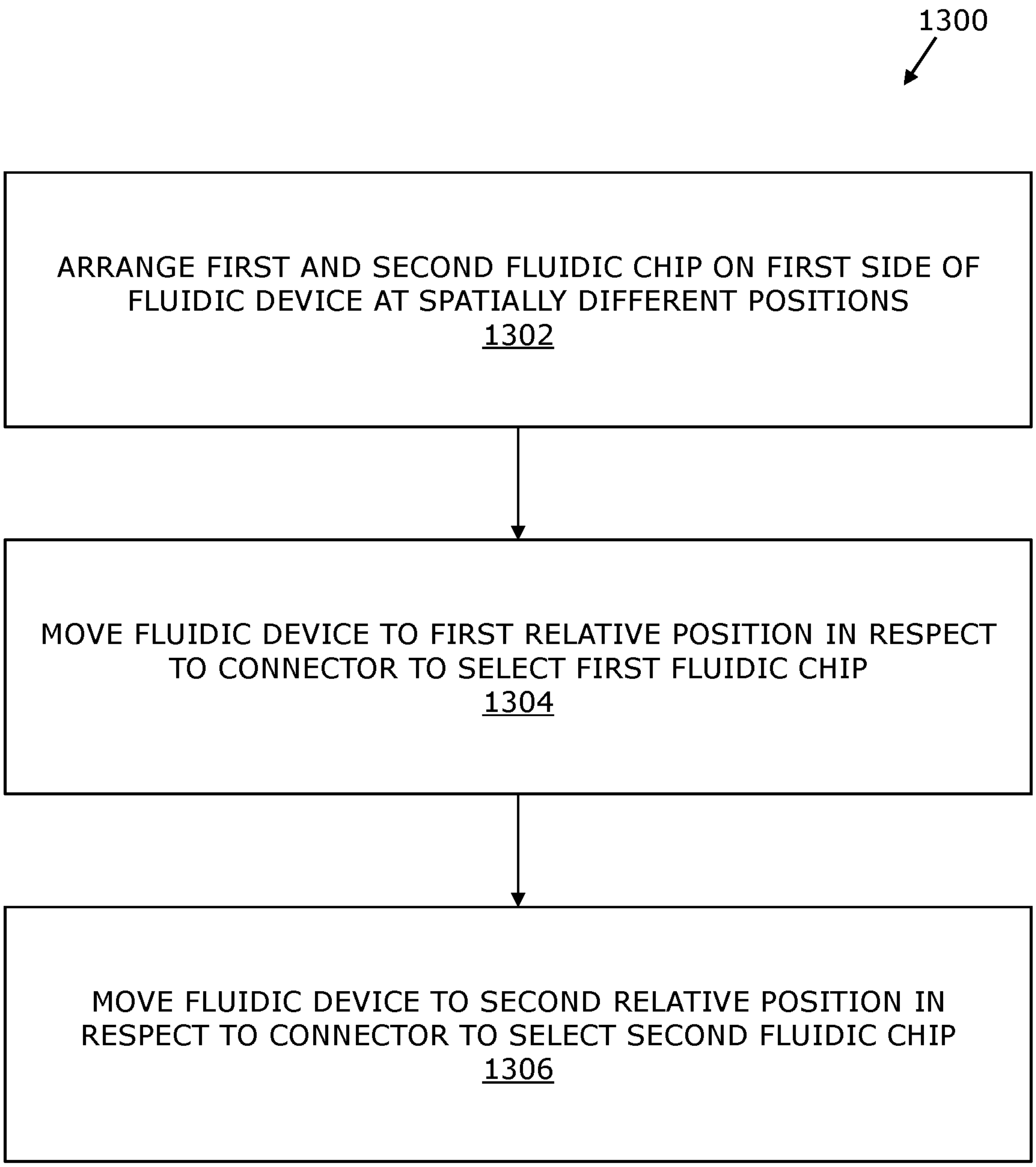
FIG. 13 is a flowchart depicting steps of a method for selecting a first or a second fluidic chip for fluidic manipulation, in accordance with an embodiment of the present disclosure.

Referring to FIG. 13, illustrated is a flowchart depicting steps of a method for selecting a first or a second fluidic chip for fluidic manipulation, in accordance with an embodiment of the present disclosure. At step 1302, a first and a second fluidic chip is arranged on a first side of a fluidic device at spatially different positions. At step 1304, the fluidic device is moved to a first relative position in respect to a connector to select the first fluidic chip. At step 1306, the fluidic device is moved to a second relative position in respect to the connector to select the second fluidic chip, wherein the connector provides source material for the selected fluidic chip and receives the printing composition from the selected fluidic chip.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A fluidic device comprising:

a first side and a second side opposite to the first side;

a first latch mechanism disposed in a first location on the first side;

a first hinged fluidic chip holder comprising a first slot for holding a first fluidic chip, the first hinged fluidic chip holder disposed on the first side and aligned with the first latch mechanism;

a second latch mechanism disposed in a second location on the first side;

a second hinged fluidic chip holder comprising a second slot for holding a second fluidic chip, the second hinged fluidic chip holder disposed on the first side and aligned with the second latch mechanism;

a fluidic connector configured to selectively engage with the first latch mechanism for a first fluidic deposition or with the second latch mechanism for a second fluidic deposition; and a traction surface configured to couple with an actuator such that the fluidic device can move to select the first fluidic chip for the first fluidic deposition or the second fluidic chip for the second fluidic deposition.

2. The fluidic device according to claim 1, wherein the first hinged fluidic chip holder and the first latch mechanism are configured to align and to couple at least one first input and at least one first output of the first fluidic chip with the fluidic connector in a first position in operation, and the second hinged fluidic chip holder and the second latch mechanism are configured to align and to couple at least one second input and at least one second output of the second fluidic chip with the fluidic connector is in a second position in operation.

3. The fluidic device according to claim 1, further comprising a third latch mechanism and a third hinged fluidic chip holder wherein the third latch mechanism and the third hinged fluidic chip holder are disposed on the second side.

4. The fluidic device according to claim 1, further comprising a first fluid channel and a second fluid channel embedded inside of the fluidic device, wherein the first fluid channel has a first opening on the first side and a second opening on the second side and the first fluid channel is between the first opening and the second opening, and wherein the second fluid channel has a third opening on the first side and a fourth opening on the second side and the second fluid channel is between the third opening and the fourth opening.

5. The fluidic device according to claim 1, further comprising an encoder and at least one encoder holder, wherein the encoder is operatively coupled to the actuator such that a position of the fluidic device during a movement of the fluidic device can be detected to select the first fluidic chip for the first fluidic deposition or the second fluidic chip for the second fluidic deposition.

6. The fluidic device according to claim 1, including an outer periphery and a middle wherein the traction surface is disposed on one or more of: the first side, the second side, the outer periphery, and the middle of the fluidic device.

7. The fluidic device according to claim 1, wherein the traction surface is a gear-tooth mechanism or a pulley-mechanism.

8. The fluidic device according to claim 1, wherein a movement of the fluidic device is one of: a linear movement or a rotational movement.

9. The fluidic device according to claim 1, further comprising at least one integrated fluidic chip having one or more fluidic inlets for receiving one or more fluids respectively;

a third output configured to remove an excess amount of one or more fluids from the at least one integrated fluidic chip; and one or more fluidic channels in between the one or more fluidic inlets and the third output, wherein the at least one integrated fluidic chip is aligned with respective latch mechanism for receiving the fluidic connector.

10. The fluidic device according to claim 1, wherein the first opening has a cross sectional area on the first side and the second opening has a second cross sectional area on the second side wherein the first cross sectional area is larger the second cross sectional area.

11. The fluidic device according to claim 1, wherein the first hinged fluidic chip holder or the second hinged fluidic chip holder or both is at least one of: a mechanical fastening, a set of protrusions, a set of fluidic protrusions having a groove, a pneumatic holder or a magnetic holder.

* * * * *